(12) United States Patent
Leach et al.

(10) Patent No.: US 7,498,009 B2
(45) Date of Patent: Mar. 3, 2009

(54) CONTROLLED SPECTRUM ULTRAVIOLET RADIATION POLLUTION CONTROL PROCESS

(75) Inventors: James T. Leach, Dana Point, CA (US); Michael Lee Fraim, Corrales, NM (US)

(73) Assignee: Dana UV, Inc., Dana Point, CA (US)

( * ) Notice: Subject to any disclaimer, the term of this patent is extended or adjusted under 35 U.S.C. 154(b) by 341 days.

(21) Appl. No.: 10/566,831

(22) PCT Filed: Aug. 11, 2005

(86) PCT No.: PCT/US2005/028637

§ 371 (c)(1),
(2), (4) Date: Feb. 1, 2006

(87) PCT Pub. No.: WO2007/061401

PCT Pub. Date: May 31, 2007

(65) Prior Publication Data

US 2008/0116054 A1    May 22, 2008

Related U.S. Application Data

(60) Provisional application No. 60/602,183, filed on Aug. 16, 2004, provisional application No. 60/661,651, filed on Mar. 15, 2005.

(51) Int. Cl.
| | |
|---|---|
| *B01D 53/56* | (2006.01) |
| *B01D 53/62* | (2006.01) |
| *B01D 53/68* | (2006.01) |
| *B01D 53/70* | (2006.01) |
| *B01D 53/72* | (2006.01) |
| *B01D 53/74* | (2006.01) |
| *B01J 19/12* | (2006.01) |

(52) U.S. Cl. ............ 423/235; 423/237; 423/240 R; 423/245.1; 423/245.2; 423/246; 423/481; 423/545; 422/105; 422/108; 422/111; 422/168; 422/170; 422/186.3; 204/157.3

(58) Field of Classification Search .............. 423/235, 423/237, 240 R, 245.1, 245.2, 246, 481, 545; 422/105, 108, 111, 168, 169, 170, 186.3; 204/157.3
See application file for complete search history.

(56) References Cited

U.S. PATENT DOCUMENTS

| | | | |
|---|---|---|---|
| 4,448,176 | A | 5/1984 | Hoppie |
| 4,585,631 | A * | 4/1986 | Pfeiffer ............... 423/235 |
| 4,885,065 | A | 12/1989 | Gilgenbach |
| 4,969,984 | A * | 11/1990 | Kawamura et al. ....... 204/157.3 |
| 4,995,955 | A * | 2/1991 | Kim et al. ............. 204/157.3 |
| 5,154,807 | A | 10/1992 | Harvey |
| 5,236,672 | A | 8/1993 | Nunez et al. |
| 5,336,476 | A | 8/1994 | Kintaichi et al. |
| 5,487,266 | A | 1/1996 | Brown |

(Continued)

Primary Examiner—Timothy C Vanoy
(74) Attorney, Agent, or Firm—William W. Haefliger

(57) ABSTRACT

A method for reducing or substantially eliminating oxides of nitrogen from an effluent gas stream, that includes providing a source of ultraviolet radiation with a precise wavelength, adding ammonia or an ammonia based reagent to the effluent stream, upstream of the ultraviolet radiation source, controllably operating the ultraviolet radiation source to irradiate the effluent stream flowing in the duct and substantially reducing or eliminating oxides of nitrogen by promotion a reaction of ammonia with the oxides of nitrogen to produce $N_2$ and $H_2O$, and also thereby destroying any surplus ammonia. This process can also be modified to oxidize carbon monoxide and VOC's to $CO_2$ and $H_2O$.

40 Claims, 26 Drawing Sheets

U.S. PATENT DOCUMENTS

| | | | |
|---|---|---|---|
| 5,524,432 A | 6/1996 | Hansel |
| 5,670,444 A | 9/1997 | Yoshida et al. |
| 5,711,147 A | 1/1998 | Vogtlin et al. |
| 5,744,112 A | 4/1998 | Irite et al. |
| 5,807,491 A | 9/1998 | Materi |
| 5,843,210 A | 12/1998 | Paranjpe et al. |
| 5,876,195 A | 3/1999 | Early |
| 6,027,616 A | 2/2000 | Babko-Malyi |
| 6,030,506 A | 2/2000 | Bittenson et al. |
| 6,038,854 A | 3/2000 | Penetrante et al. |
| 6,066,590 A | 5/2000 | Horii et al. |
| 6,117,403 A | 9/2000 | Alix et al. |
| 6,139,694 A | 10/2000 | Rogers et al. |
| 6,146,605 A | 11/2000 | Spokoyny |
| 6,153,159 A | 11/2000 | Engeler et al. |
| 6,176,078 B1 | 1/2001 | Balko et al. |
| 6,224,839 B1 | 5/2001 | Fan et al. |
| 6,264,899 B1 | 7/2001 | Caren et al. |
| 6,267,940 B1 | 7/2001 | Chang et al. |
| 6,287,111 B1 | 9/2001 | Gensler |
| 6,345,495 B1 | 2/2002 | Cummings |
| 6,345,497 B1 | 2/2002 | Penetrante |
| 6,346,419 B1 | 2/2002 | Ryerson et al. |
| 6,365,112 B1 | 4/2002 | Babko-Malyi et al. |
| 6,395,238 B1 | 5/2002 | Rogers et al. |
| 6,468,489 B1 | 10/2002 | Chang et al. |
| 6,475,350 B2 | 11/2002 | Palekar et al. |
| 6,488,740 B1 | 12/2002 | Patel et al. |
| 6,503,469 B2 | 1/2003 | Izumi et al. |
| 6,506,351 B1 | 1/2003 | Jain et al. |
| 6,523,277 B1 | 2/2003 | Claggett |
| 6,550,250 B2 | 4/2003 | Mikkelsen et al. |
| 6,562,309 B2 | 5/2003 | Burke et al. |
| 6,566,300 B2 | 5/2003 | Park et al. |
| 6,605,263 B2 | 8/2003 | Alix et al. |
| 6,612,249 B2 | 9/2003 | Sanders |
| 6,651,638 B1 | 11/2003 | Oakes |
| 6,676,912 B1 | 1/2004 | Cooper et al. |
| 6,682,709 B2 | 1/2004 | Sudduth et al. |
| 6,725,643 B1 | 4/2004 | Paul |
| 6,730,125 B1 | 5/2004 | Lin |
| 6,739,125 B1 | 5/2004 | Mulligan |
| 6,742,326 B2 | 6/2004 | Xu et al. |
| 6,743,404 B1 | 6/2004 | Schumacher et al. |
| 6,761,863 B2 * | 7/2004 | Hwang et al. ............... 423/235 |
| 6,773,555 B1 | 8/2004 | Izutsu et al. |
| 6,811,759 B2 | 11/2004 | Tsuchiya et al. |
| 6,907,831 B1 * | 6/2005 | Rising ....................... 110/345 |
| 7,156,957 B1 * | 1/2007 | Parrish et al. ............ 204/157.3 |

* cited by examiner

FIG. 1c.

Oxidation

$O' + CO \Rightarrow CO_2$
$O' + NO \Rightarrow NO_2$
$O' + H_2O \Rightarrow 2OH$
$O' + NH_3 \Rightarrow NH_2' + OH$
$OH + CO \Rightarrow CO_2 + H$
$OH + CH_2O \Rightarrow H_2O + HCO$
$OH + NO \Rightarrow H + NO_2$
$OH + NO_2 \Rightarrow HNO_3$
$OH + NH_3 \Rightarrow NH_2' + H_2O$
$HCO + O_2 \Rightarrow HO_2 + CO$
$H + O_2 \Rightarrow HO_2$
$HO_2 + NO \Rightarrow OH + NO_2$
$HO_2 + CO \Rightarrow OH + CO_2$

Reduction

$NH_2' + NO \Rightarrow N_2 + H_2O$
$NH_2' + NO_2 \Rightarrow N_2 + H_2O_2$
$H + N_2O \Rightarrow N_2 + OH$
$H + NO \Rightarrow HNO$
$H + NO_2 \Rightarrow HNO_2$
$H + O_2 \Rightarrow HO_2$
$H + CO \Rightarrow HCO$

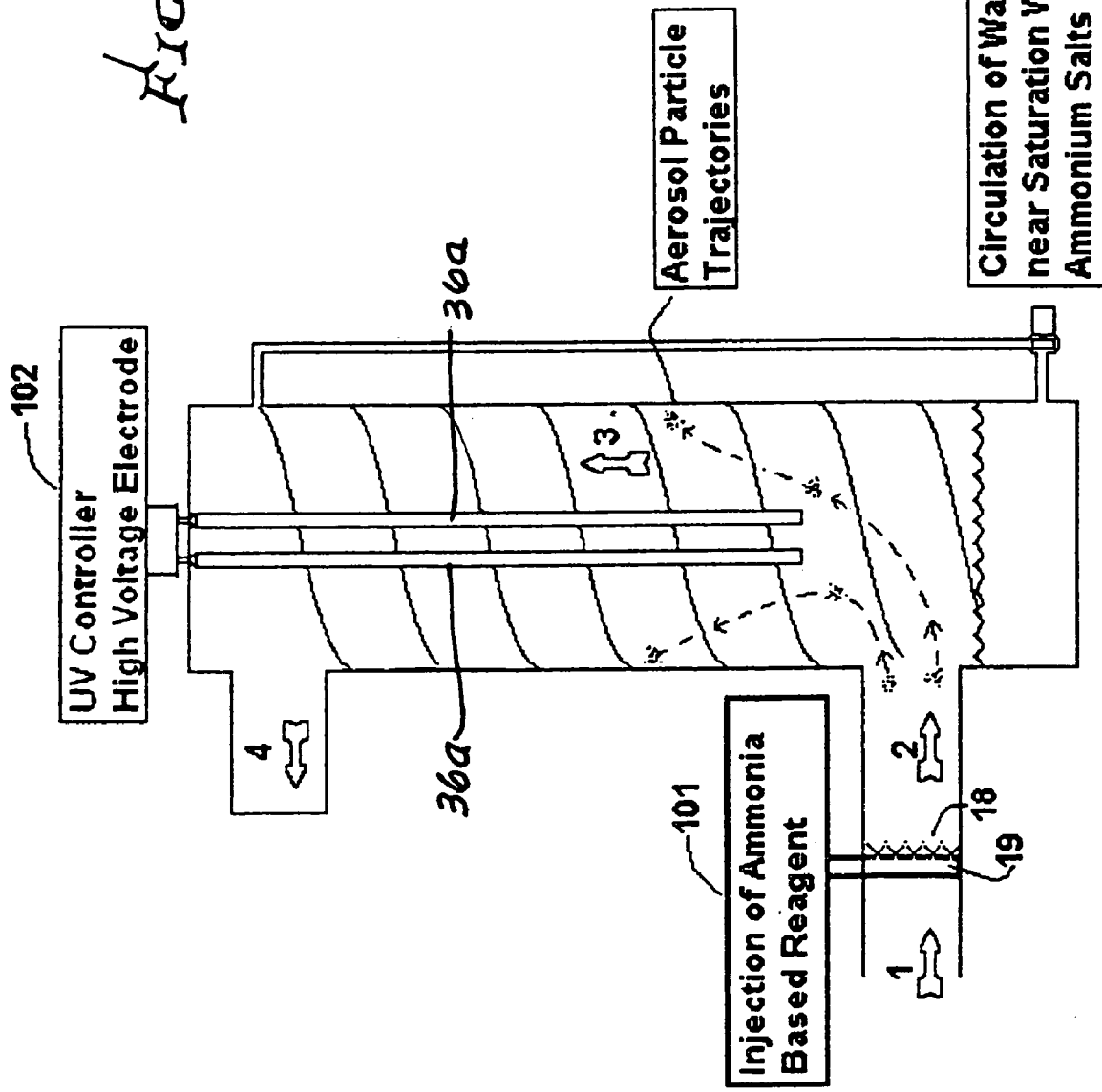

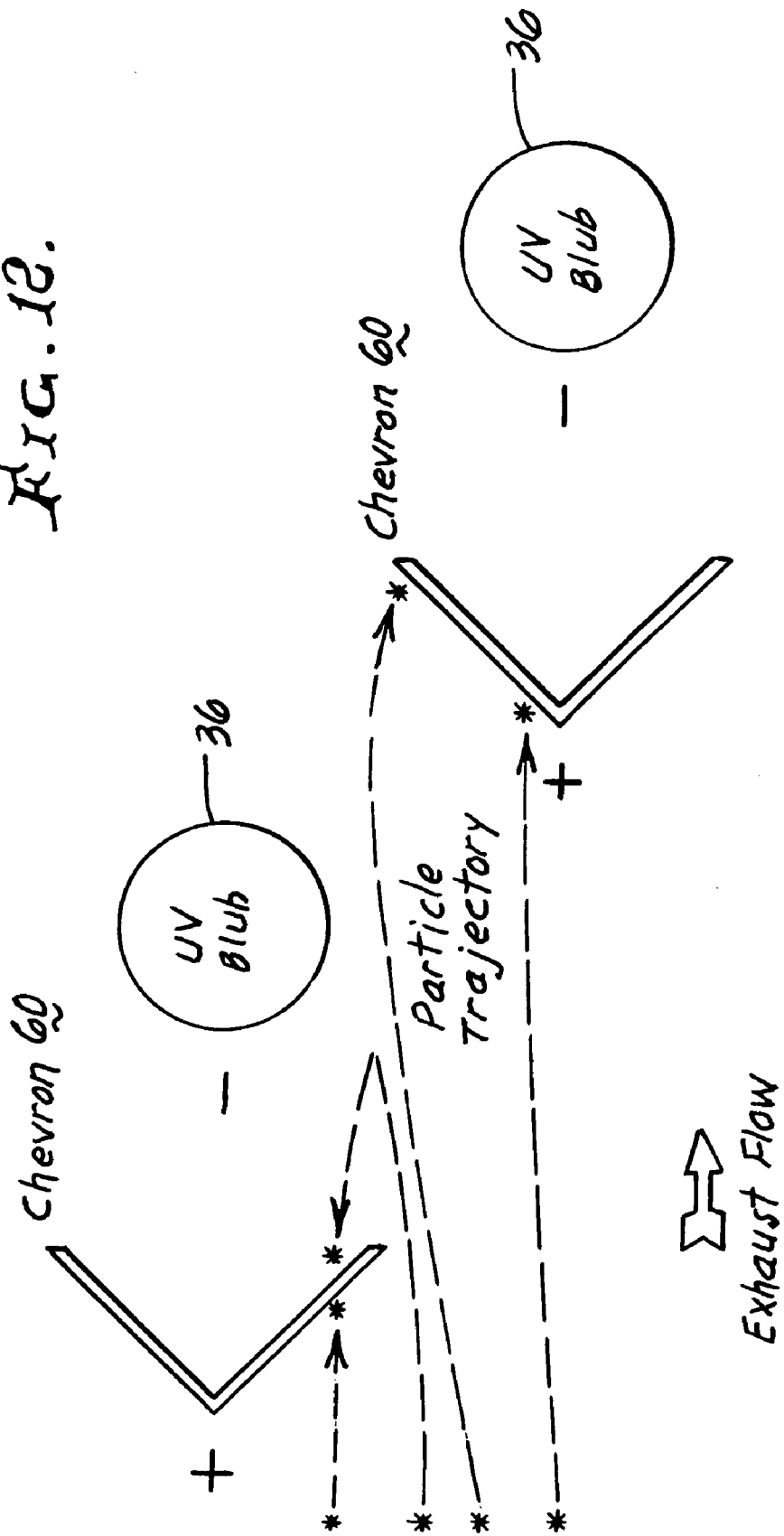

Fig. 13a.

UV Bulb 36
Annular Flow Nozzle
STACK

Fig. 13.

STACK
Exhaust Flow
UV Bulb
36
Particle Trajectory
Compressed Filtered Air Injection

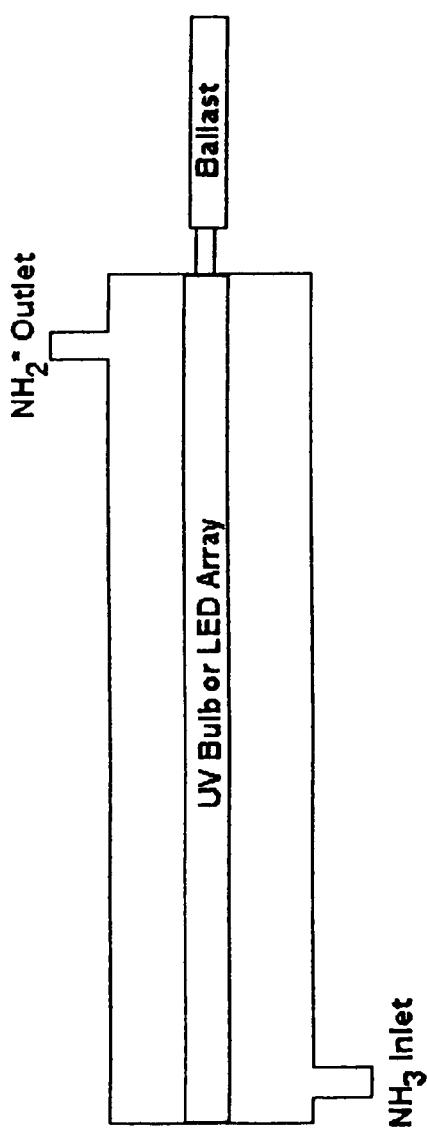
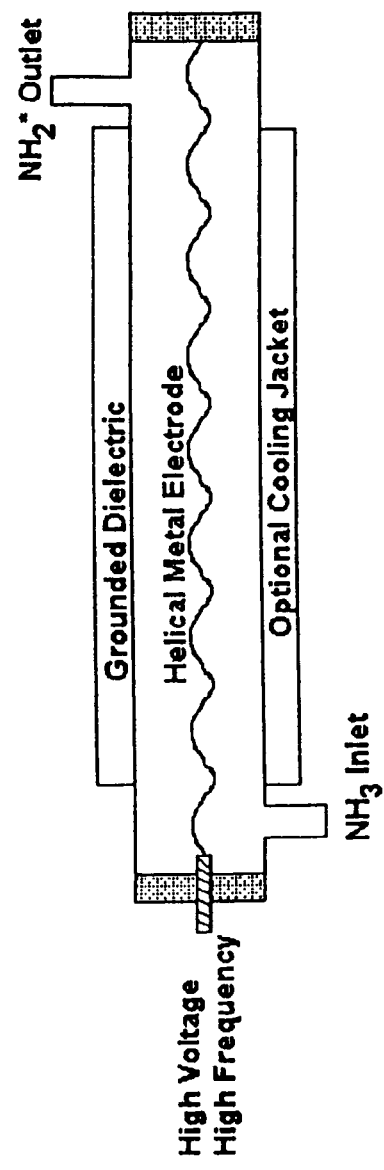
Fig. 14a.
Fig. 14b.

Care must be taken to generate free radicals close enough to burner tip to prevent significant recombination before flame front

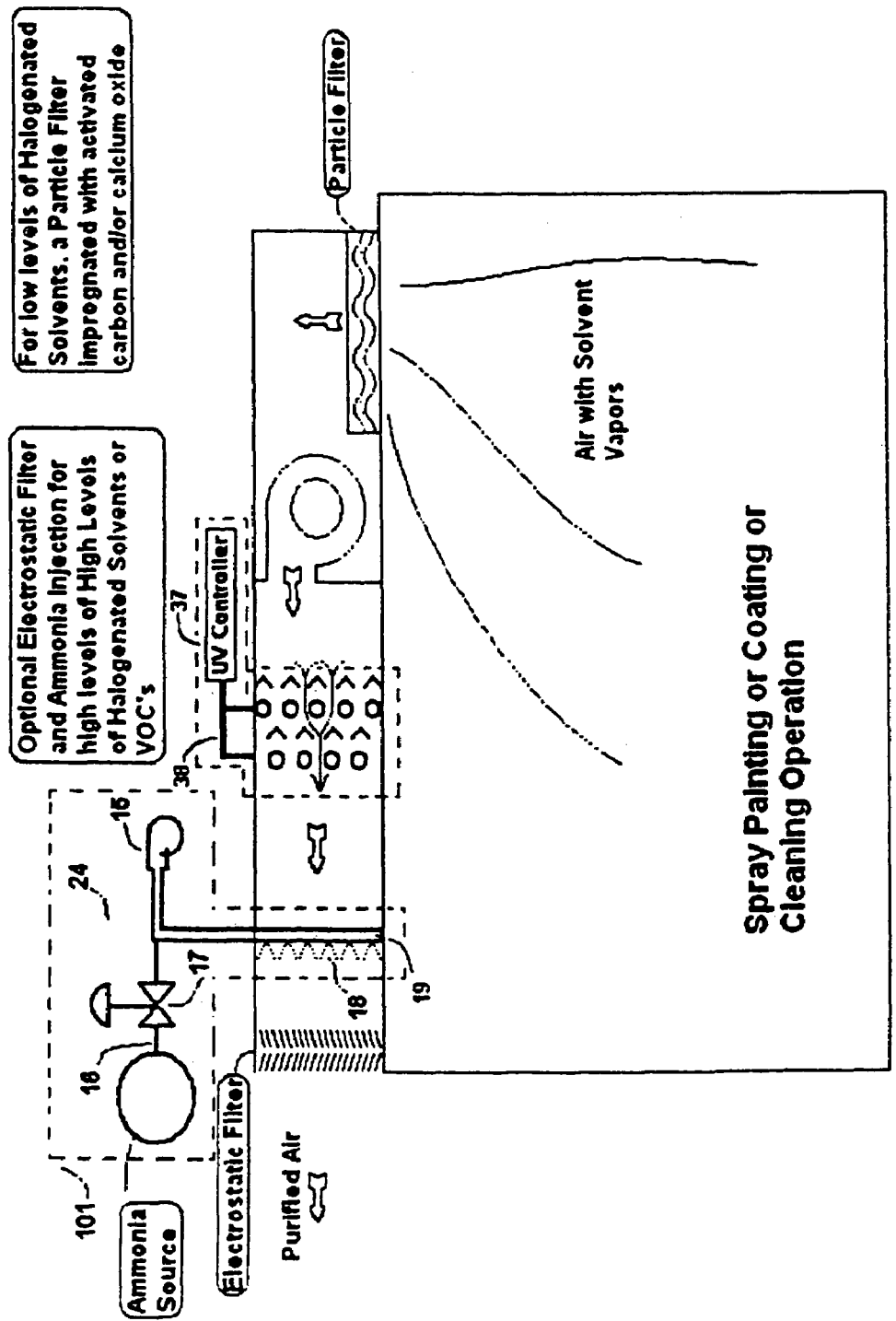

CONTROLLED SPECTRUM ULTRAVIOLET RADIATION POLLUTION CONTROL PROCESS

FIELD OF THE INVENTION

This invention relates generally to the reduction or elimination of oxides of nitrogen, ammonia, and combustion contaminants from effluent gas streams, such as are produced from combustion processes or chemical processes and it further relates to the use of ultraviolet radiation for supplying the energy and enhancing reaction probabilities of the selected pollutant species. More particularly, the present invention relates to the reduction or elimination of such undesirable gases by applying ultraviolet radiation in carefully controlled wavelengths, intensity, and stages of treatment to achieve the desired reactions. For the reduction of $NO_x$ emissions, an ammonia-based reagent ($NH_3$), is added to the effluent gas stream and then photo-chemically dissociated into hydrogen gas ($H_2$) and the amidogen radical ($NH_2^*$), to cause the photo-catalytic reduction of nitrogen oxides, $NO_x$, ($NO$, $N_2O$, $NO_2$, $N_2O_2$, $N_2O_5$, $N_2O_3$, $NO_3$) to nitrogen gas ($N_2$) and water vapor ($H_2O$). Combustion contaminants ($H_xO_xO_x$) formed by the incomplete combustion of fuels and volatile organic compounds (VOC's) are oxidized to water vapor ($H_2O$) and carbon dioxide ($CO_2$) by the free radicals created from photolysis of water vapor ($H_2O$) and molecular oxygen ($O_2$) present in the exhaust gas stream. The photolysis of water vapor and oxygen is completed using an ultraviolet light source with high output in the VUV band.

BACKGROUND OF THE INVENTION

1. Methods of Controlling $NO_x$ Gases in Effluent Gas Streams

In the case of reducing the concentration of the oxides of nitrogen (abbreviated as $NO_x$ and consisting generally $NO$, $NO_2$, $N_2O$, and $N_2O_2$), there are numerous existing techniques for controlling the release of this class of pollutants into the air from combustion processes or other processes that generate effluent gas streams. These are principally classified as techniques that are applied at the origin of these gases, such as improving the control of combustion processes and those processes that are applied after the combustion processes to treat the gases after the $NO_x$ has been formed.

Techniques that improve the control of the combustion process focus on the elimination of peak flame temperatures over 2000° K that are the primary cause for the formation of $NO_x$. Processes that seek to destroy $NO_x$ after it has been formed are generally called post combustion processes and they are used when techniques for controlling NOx formation are not adequate to meet the emission limit goal.

Techniques employed to minimize the formation of $NO_x$ in combustion processes generally involve the use of one or more methods of diluting the flame with inert gases that absorb thermal energy and normalize localized combustion temperatures. Methods have been applied that dilute the fuel with steam or water to achieve this dilution and other methods rely on the recirculation of combustion products. In some cases, the existing combustion equipment can be modified to achieve moderate control of NOx emissions using these techniques, and these modifications are typically inexpensive and very cost effective to apply. These include laminar flame combustor that avoids high combustion temperatures by a combination of air dilution and laminar combustion and use of a porous solid combustion catalyst to reduce the flame temperature in gas turbines burning gaseous fuels. This technique has demonstrated the ability to achieve very low $NO_X$ levels but long term reliability and engine risk issues have limited the commercial applicability of this product. Combustion modification techniques have demonstrated single digit $NO_X$ levels but these techniques have not demonstrated that they can achieve reliable and efficient operation of the combustion device and also achieve $NO_X$ emissions below 6 ppm.

Post combustion processes can affect much lower emission levels than are achievable through the use of techniques that minimize the formation of $NO_x$ during combustion. Moreover, these processes have been refined over the years to achieve better results and to cost less to implement, and are widely applied. However, pollution control authorities continue to demand even lower $NO_x$ emission levels, and post combustion processes are approaching performance limitations caused by physical and chemical constraints inherent to their methods of operation. The result is a disjoint in the $NO_x$, CO and ammonia slip control capability desired by regulatory authorities and the capability which is technically achievable and financially affordable using these processes. This situation produces a need for a different technology that does not have such inherent process constraints because of the manner and method of operation, and therefore can achieve the more aggressive emission limits desired by the regulatory authorities and needed by society to reduce the effects of air pollution.

Post combustion processes include, but are not limited to, selective catalytic reduction (SCR), selective non-catalytic reduction (SNCR), or a combination of these processes, called the selective hybrid reduction process (SHR). These processes are applied to gas streams containing oxygen and rely on a reagent to react with $NO_x$ in a reduction chemical reaction. The desired end products are water vapor ($H_2O$), diatomic nitrogen ($N_2$), and oxygen ($O_2$). Typical applications include boilers, heaters, furnaces, gas turbines, lean burn gaseous fueled engines, Diesel engines, and dryers. Since oxygen is present in the effluent streams, a reagent is necessary to promote the reduction reaction chemistry. The most suitable reagents discovered so far are ammonia based. Practicable ammonia based reagents include ammonia (anhydrous and aqueous) and urea. Urea decomposes to ammonia in when it is heated above about 700K. Urea is an alternative source of ammonia for the SCR, SNCR, and SHR processes when the on-site storage of ammonia is deemed a safety risk.

a. SNCR Process

In the case of SNCR, the reagent is added exhaust at high post combustion temperatures ranging typically from 1150° K to 1290° K to dissociate ammonia into $NH_2^*$ and providing the reactant for reducing $NO_x$. No catalyst is involved. But SNCR has application characteristics that limit its performance and practicality for controlling $NO_x$ emissions. These characteristics include:

Low reagent utilization efficiency

High carrier gas requirements

High sensitivity to inlet NOx c concentration

Dependence on relatively ineffective gas phase mixing of the reagent with $NO_x$ molecules Dependence on narrow temperature range for effective performance Elevated reaction temperature that is difficult to access in many combustion devices.

The process typically achieves 50% to 60% $NO_x$ reduction performance, but in some cases the performance can be outside this range if the application conditions are particularly good or particularly poor.

The effective temperature window of this process is between about 1150K and 1290K. The initial and final temperatures of this range are not absolute. The temperature window is a function of the gas cooling rate in the apparatus. For example, in an application where the gases cool relatively slowly, such as in a duct with ambient heat losses, the reactivity zone shifts to slightly lower temperatures. In applications where the gases cool rapidly, such as in a boiler, gas temperatures at the upper range of the reactivity zone must be accessed to achieve acceptable $NO_x$ reduction performance.

Injection of the reagent at the upper range of the temperature zone causes much of the ammonia to become oxidized by the molecular oxygen in the gas stream to form $NO_x$ in a competing reaction. A similar problem at the elevated temperatures is that some of the ammonia will dissociate completely before it has a chance to react with the $NO_x$. If the reagent is injected at even higher temperatures, it is possible to produce more $NO_x$ in the gas stream. Similarly, injection at temperatures that are too low compromises the process. At gas temperatures below about 1150° K the ammonia dissociation rate is reduced to the point that too much ammonia will slip by the reaction zone and become released out the stack. For these reasons, this process is sensitive to the effluent gas temperature and cooling rate.

The process is very sensitive to inlet NO concentration which limits its usefulness in some cases. The process is much more effective with high inlet $NO_x$ concentrations, but at moderate or low inlet $NO_x$ concentrations the process becomes significantly less effective. When the inlet $NO_x$ concentrations are in the order of 15-20 ppm the process becomes essentially ineffective, particularly if the combustion apparatus cools the gases at a rapid rate such as would be the case in a boiler.

The method of applying the SNCR process is particularly difficult because of the very high gas temperatures involved. This is particularly a problem in larger combustion devices that have large cross sectional areas. The need to achieve almost instantaneous injection and mixing of the ammonia into the furnace gases of large combustion devices is a difficult challenge and the best methods still consume large amounts of carrier gas and require expensive stainless steel injection hardware.

The SNCR process performance is also very sensitive to $NO_x$—$NH_3$ concentration uniformity and temperature uniformity. At the reaction temperatures involved in this process, gases are typically very turbulent with very non-uniform temperature and gas concentration gradients. Injecting ammonia into gases with these properties results in very poor ammonia utilization. $NO_x$ reduction performance is very limited and ammonia slip can be excessive, particularly if the effluent gases are cooling at a rapid rate.

As a result of the difficult application conditions associated with the SNCR Process, this process is generally limited to effluent gas streams from the combustion of very dirty fuels that restrict the use of other post combustion $NO_x$ reduction technologies.

b. SHR Process

The SHR process is employed when the SNCR process cannot quite meet the $NO_x$ emission goal and there is a technical need to minimize the use of catalyst material used in the SCR process, such as may be caused by space or pressure drop constraints. The ammonia slip from the upstream SNCR process is used in the downstream SCR process to complete the reaction of ammonia with the $NO_x$. This process has very limited application because it has all of the disadvantages associated with the SNCR Process which results in higher operating costs than the SCR Process. It has been applied to combustion devices that do not have physical space for a large SCR catalyst or which cannot tolerate the pressure drop that would be caused by a full sized SCR catalyst.

c. SCR Process

In the case of SCR, the reagent is injected and mixed into the effluent gas stream for reaction with $NO_x$ in the solid catalyst bed. Practicable reagents include ammonia and urea. The ammonia is adsorbed into the catalyst matrix and converted to $NH_2^*$ by the reduction of $V^{+5}$ to $V^{+4}$ metal oxide. The optimum operational temperature range is typically from 570° K to 670° K. For temperatures exceeding 690° K, $NH_2^*$ significantly reacts the molecular oxygen in the exhaust, thus increasing ammonia demand. For temperatures less than 570° K, nitrogen dioxide, $NO_2$, combines with ammonia, $NH_3$, to form ammonium nitrate salt, $NH_4NO_3$, which is considered a pollutant in the exhaust gas and the $NO_x$ reduction rates in the catalyst become impractically slow. For a near perfect ammonia distribution in the exhaust gas, multiple mixing zones are used in the catalyst bed to achieve 2-3 ppm $NO_x$ slip with 5-6 ppm $NH_3$ slip. Multiple mixing zones increase the friction pressure drop of the exhaust gas and size of the catalyst bed, which in turn increases the fan horsepower to push or draw the exhaust gas through the bed.

The physical chemistry of gas-solid interface phenomena results in practical performance limitations of the SCR process such as some of the $NO_x$ can pass through the catalyst bed and not collide with $NH_2^*$ radicals and thereby fail to be controlled by the SCR process, resulting in $NO_x$ emissions. A further limitation is that the ammonia may not be evenly mixed in the exhaust gas stream when it reaches the catalyst face, thus causing regions of excess ammonia that result in ammonia slip emissions and/or regions of excess $NO_x$ that will not react with $NH_2^*$ completely and pass out the stack uncontrolled. An added limitation is that the temperature of the effluent gases may not be sufficiently uniform across the catalyst face to cause the catalyst to function optimally or that the bulk gas temperature is either too low or too high for the catalyst to function optimally. Uneven or concentrated gas flow through the catalyst bed can create a region of high effluent velocity. This high effluent velocity can reduce the effectiveness of the catalytic bed by lowering the residence time of the effluent gas to the catalyst. Another limitation of the SCR process is that the catalyst bed can become fouled or poisoned by contaminants in the effluent gas stream and rendered ineffective. Another limitation is that the catalyst bed can fail to be sealed properly in the reactor vessel causing gas by-passing and the release of unreacted ammonia and $NO_x$ to the atmosphere.

In addition to the aforementioned functional limitations, the SCR process has other disadvantages to prospective users. These include, but are not limited to, the very large size of the catalyst bed, the cost of the catalyst material, the impact of the pressure drop caused by the catalyst bed, and the magnitude and range of temperature that must be maintained for the process to work properly.

The SCR process requires that the catalyst bed be large enough to achieve a minimum residence time of the reactant gases in the bed in order for the physical chemistry to proceed. This results in large catalyst beds that can often be difficult and expensive to install. The cross sectional area of the bed can be optimized to reduce the bulkiness of the beds, but the required residence times must be maintained and smaller flow areas must be offset by thicker beds. Increasing the thickness of the bed causes a non-linear increase in pressure drop and therefore energy cost to maintain flow. Pressure drops through SCR catalyst beds can range from 1 inch water column to more than 5 inches water column. This pressure drop consumes energy from the gas turbine to enable effluent stream flow rate to be maintained.

Catalyst beds associated with the SCR process are also very heavy and this results in the need for significant structural capability of the apparatus and support foundations. The weight also requires heavy lifting equipment during construction. These requirements further add to the installation cost. The materials used to coat the catalyst substrate are rare alloys that are expensive to buy and apply and therefore cause the catalyst material to be undesirably expensive.

The SCR process is also very temperature dependent and it is often necessary to make such modifications as necessary in the equipment employed to use the effluent stream so as to make access to the correct temperature window for the SCR reaction. The correct catalyst temperature window can range from less than 477° K to as much as 700° K depending on the catalyst material used. This temperature range is normally found in the middle of a thermal device employed to recover energy from the effluent stream, and access requires the alternation of the heat recovery device at the precise location to enable access to the correct SCR operating temperature. Furthermore, if the heat recovery device is a boiler used for the production of steam, the correct temperature may be within the evaporator tube bundle, whereupon the creation of an installation cavity would be expensive and may cause boiler circulation problems. Therefore, the SCR process is known to have significant physical and chemical shortcomings that cause the SCR process to be understandably expensive to install and use, and also to have limited NOx reduction performance capability.

In these processes, ammonia dissociates into $NH_2^*+H$ on the surface of the catalyst which is a reducing agent to $NO_x$. $NH_2^*$ and absorbed $NO_x$ molecules collide and react to form $N_2$ and $H_2O$. $NO_2$ helps reset the catalyst sites by reacting with the absorbed H to form water. The overall chemical reactions are given by:

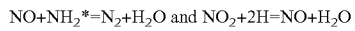

$$NO+NH_2^*=N_2+H_2O \text{ and } NO_2+2H=NO+H_2O$$

All three processes are presently in active use, and the selection of the most appropriate process is generally made on the basis of the lowest evaluated cost method of meeting the $NO_x$ emission goal. The least expensive and also the least effective process is the SNCR process and the most effective and more expensive $NO_x$ reduction technology is currently the SCR process equipped with an ammonia destruction catalysts.

2. Methods of Controlling Combustion Contaminants and VOC's

VOC's are a general class of compounds that are organic and that have vapor pressures that are low enough to allow them to become airborne. More specifically, as applied to the science of air pollution, these compounds have properties that cause them to be toxic to plants and animals in their raw state or that are precursors to air pollutants that become formed in the atmosphere. These compounds are of significant interest to the public and to air quality regulators responsible for air quality maintenance and their release into the atmosphere is therefore regulated.

There are thousands of VOC's made by man and also thousands of processes that can cause the accidental release of these compounds into the atmosphere. Some examples include painting and coating operations, printing, chemical processing, food processing, baking, fast food broilers, and any process that generates odors.

The variability in the amount and concentration of these compounds released by various anthropogenic sources resulted in the development of different types of technologies for their abatement. But all of these technologies can be classified into fundamental process methods, absorption, thermal or catalytic oxidation, adsorption, refrigeration, biological oxidation, and photochemical oxidation.

a. Absorption

Absorption methods for controlling VOC's consist of scrubbing the effluent gas stream with a chemical solution that absorbs the organic compounds. The scrubbing solution can be water or a water based solution or it maybe another organic compound such as a glycol based solution. In water scrubbers, the VOC rich effluent liquid stream maybe disposed of directly or removed from the scrubbing fluid by adsorption or precipitation. In the case of scrubbing processes that use an organic compound to absorb the VOC's, the VOC rich effluent liquid stream is typically heated to desorb the VOC's and then recirculated back to the reactor. In some cases the VOC's can be converted to useful by-products but often the VOC's end up in wastewater for direct disposal into city sanitary sewers or water treatment facilities.

Scrubbers are effective for very few VOC compounds and for that reason, are not widely used for VOC emission control. Most VOC's are not absorbent in water. Hydrocarbons can be readily absorber into glycol or mixtures of glycol and alcohols and effluent streams laden with these compounds are often treated by this method.

Since gas scrubbing relies on a gas-to-liquid phase interaction, the efficiency of the process is constrained by mixing and boundary layer effects, and high removal efficiencies are difficult to achieve. The removal efficiencies can be improved by increasing the energy intensity of the scrubbing process but the higher energy cost and decreasing absorption gains limit the cost effectiveness of this approach.

The process of scrubbing VOC's from effluent streams transfers the VOC's from the effluent gas stream to the scrubbing liquor, and the purified gas stream is released into the atmosphere or to use in some other process. The gaseous organic compounds then must be removed from the scrubbing liquor so that the liquor can be recycled to the reactor. In closed cycle applications the rich scrubbing liquor is fed to a desorber column where it is heated and or reduced in pressure by vacuum means to draw out the effluent. The effluent is the condensed or incinerated depending on the nature and value of the particular compound involved.

Thermal oxidizers handling VOC materials that contain chlorine, fluorine, or bromine atoms generate HCL, CL2, HF, and HBr as additional reaction products during oxidation, and scrubbers are applied downstream of the thermal oxidizers to remove these contaminants.

b. Thermal Oxidation

The process of thermal oxidation raises the effluent gas stream several hundred degrees above the autoignition temperature of the VOC's in the stream that are to be destroyed. The products are retained at high temperatures for a specific length of time, called the residence time, to achieve high VOC destruction rates. The residence times may range from a fraction of a second to over two seconds.

Thermal oxidizers operate at high temperatures, typically between 1000° F. to 1600° F. and a fuel is burned to furnish enough thermal energy for the VOC's to oxidize. Recuperative heat exchangers are employed to reduce fuel consumption and these heat exchangers can be designed to be nearly 70% effective in reclaiming heat. Destruction efficiencies depend on many factors including the stability of the organic compounds that are being destroyed and the design parameters of the thermal oxidizer, but a properly designed and operated thermal oxidizer can achieve 99% destruction efficiency.

Thermal oxidation is employed when the effluent stream contains sulfur, halogenated compounds, or some metals such as lead, phosphorus, zinc, or tin, or if they are extremely stable and difficult to destroy. However, the incineration of VOC's that contain chlorinated compounds can create the formation of dioxins and furans if the combustion process is not complete.

A significant disadvantage of thermal oxidation is that it creates $NO_X$ from the high temperature combustion process. Also, to avoid the danger of explosion when using incineration techniques, the concentration of the VOC materials should total less than 25% of the lower explosion limit (LEL).

c. Catalytic Oxidation

The current art for controlling some VOC's is a process called catalytic oxidization. Catalytic oxidation is a process involving the following steps:
- The effluent gas stream is drawn into a heat exchanger to preheat the effluent stream by hot exhaust gases from the oxidization process.
- The preheated effluent stream is drawn into a combustor and mixed with the products of combustion from an auxiliary burner burning an external fuel such as natural gas.
- The effluent stream is mixed with the combustion products and drawn into a catalyst bed and temperature controlled to the optimal temperature for the catalyst bed.
- The catalyst material, typically a noble metal catalyst material such as platinum or palladium, promotes the oxidation of the VOC's.
- The purified effluent stream is drawn into the heat exchanger used to preheat the inlet effluent stream and blown to the atmosphere with an induced draft fan.

Catalytic oxidizers can operate in a temperature range between about 530° K to 800° K, but more typically between 550° K to 620° K. Destruction efficiencies can be as high as 99.9%. They are in common use for destroying many types of VOC materials because they use less fuel than thermal oxidizers but they do have certain disadvantages: they cannot be used on sources that also generate small amounts of catalyst poisons such as tin, phosphorus, zinc, and lead. Also, they are vulnerable to chemicals or particulate matter that can mask or foul the catalyst surface.

For effluent stream containing dilute concentrations of VOC contaminants, incineration techniques are an expensive control method just due to the large fuel cost. Current best art for effective control of such effluent streams involves the adoption of a pretreatment step to concentrate the VOC's so that the amount of gas that must be heated is smaller.

VOC concentrators consist of absorbers that strip the VOC's from the effluent gas stream and discharge the purified effluent stream. The adsorbers can strip off the VOC's until they saturate and then they must be switched over for VOC desorption. In the VOC desorption stage, clean air mixed in with incineration off gas is used to drive the VOC's.

d. Adsorption

Adsorption is the process that involves the adherence of gaseous molecules into porous materials. A familiar adsorption process is the use of activated carbon to remove chemicals and odors from water. Activated carbon is also the primary adsorbent material used for VOC removal in effluent gas streams. An absorption system used for removal of VOC materials would contain beds of carbon situated in a reactor in a manner such that all of the effluent gas stream must pass through the adsorbent material.

Adsorbent technology is used when the effluent stream only contains one to three specific organic solvents and that it is economical to recover these solvents or when the VOC concentration is very dilute and it is desired to pre-concentrate the VOC's for thermal or catalytic oxidation.

Adsorption technology is typically most effective on sources that generate organic compounds having a molecular weight of more than 50 and less than approximately 200. The low molecular weight compounds adsorb poorly and the high molecular weight compounds adsorb so well that they can be very difficult to desorb to allow the adsorbent to be reused.

Adsorbent systems are not recommended for streams that contain particulate matter and/or high moisture concentrations because they compete for the pore spaces on the adsorbent and this reduces the number of pores available for the VOC material.

e. Refrigeration

Condensation, refrigeration, and cryogenic systems remove organic vapor by making them condense on cold surfaces. These cold conditions can be created by passing cold water through an indirect heat exchanger, by spraying cold liquid into an open chamber with the gas stream, by using a Freon-based refrigerant to create very cold coils, or by injecting cryogenic gases such as liquid nitrogen into the gas stream. The concentration of VOC's is reduced to the level equivalent to the vapor pressures of the compounds at the operating temperature. Condensation and refrigeration systems are usually used on high concentration, low gas flow rate sources. Typical applications include gasoline loading terminals and chemical reaction vessels.

The removal efficiencies attainable with this approach depend strongly on the outlet gas temperature. For cold-water-based condensation systems, the outlet gas temperature is usually in the 40 to 50° F. range, and the VOC removal efficiencies are in the 90 to 99% range depending on the vapor pressures of the specific compounds. For refrigerant and cryogenic systems, the removal efficiencies can be considerably above 99% due to the extremely low vapor pressures of essentially all VOC compounds at the very low operating temperatures of −70° F. to less than −200° F.

Condensation, refrigeration, and cryogenic systems are usually used on gas streams that contain only VOC compounds. High particulate concentrations are rare in the types of applications that can usually apply this type of VOC control system. However, if particulate matter is present, it can accumulate on heat exchange surfaces and reduce heat transfer efficiency.

f. Biological Oxidation

Biological systems are a relatively new control device in the air pollution control field. VOC's can be removed by forcing them to absorb into an aqueous liquid or moist media inoculated with microorganisms that consume the dissolved and/or adsorbed organic compounds. The control systems usually consist of an irrigated packed bed that hosts the microorganisms (biofilters). A presaturator is often placed ahead of the biological system to increase the gas stream relative humidity to more than 95%. The gas stream temperatures are maintained at less than approximately 105° F. to avoid harming the organisms and to prevent excessive moisture loss from the media.

Biological oxidation systems are used primarily for very low concentration VOC-laden streams. The VOC inlet concentrations are often less than 500 ppm and sometimes less than 100 pm. The overall VOC destruction efficiencies are often above 95%.

Biological oxidation systems are used for a wide variety of organic compounds; however, there are certain materials that are toxic to the organisms. In these cases, an alternative type of VOC control system is needed.

g. UV Oxidation

One method of using UV energy to activate the oxidation of VOC's involves the use of hydrogen peroxide and is currently being tested. The requirement to use hydrogen peroxide has been determined to be a significant safety issue and cost and so the current art of the use of ultraviolet energy is not commercially viable.

Another technique relies on UV emitters that have wavelengths greater than 250 nm and that cause the dissociation of nitrogen molecules, and thereby promoting the formation of $NO_x$.

The SUVR process for VOC destruction is a more cost effective approach to controlling VOC pollutants than thermal oxidation because it does not require the use a fuel or fans to overcome the pressure drop caused by the incinerator and heat exchangers. It is does not require the use of a precious metal catalyst such as in the catalytic oxidation process nor is it limited in the gases it can treat such as catalytic oxidation.

The SUVR process will not displace adsorption and refrigeration processes that are applied to effluent gases to remove and recycle the VOC's because the SUVR process is an oxidation process and destroys the organic solvents.

3. Description of Prior Art

Further in regard to the above, thermal $NO_x$ (NO, $N_2O$, $NO_2$), CO, VOC's partially oxidized hydrocarbons ($C_xH_yO_x$), $SO_x$ ($SO_2$, $SO_3$) from mobile and stationary combustion sources are major air pollutants in high-density urban areas. Air pollution remains a problem in these urban areas and environmental regulatory organizations continue to develop new regulations to force more effective and lower cost means for reducing such emissions.

In the case of $NO_x$ emissions, there are three major classifications of post combustion $NO_x$ removal methods. These are: reducing $NO_x$ to $N_2$ with a reactant, oxidizing $NO_x$ into nitrogen acids ($HNO_2$, $HNO_3$) with wet/dry scrubbing, and direct absorption on a solid. The method of reducing $NO_x$ to $N_2$ by means of using a reactant has become the most cost effective and highly developed means applied in today's marketplace and for all practical purposes represents current state-of-the-art. There are three sub-classifications of the $NO_x$ reducing methods in general use today; Non-Selective Catalytic Reduction (NSCR), Selective Catalytic Reduction (SCR) and Selective Non-Catalytic Reduction (SNCR).

Oxidizing $NO_x$ into nitrogen acids with wet/dry scrubbing appears economical only for large stationary combustion sources where there is a fertilizer demand, or where the fuel has high sulfur or ash content. This wet/dry scrubbing process is described in U.S. Pat. Nos. 6,605,263 and 6,676,912. U.S. Pat. No. 6,605,263 describes how to inject ammonia to convert $SO_x$ into an ammonium salt, $(NH_4)_2SO_4$, which is then removed with a wet scrubber. U.S. Pat. Nos. 6,676,912 and 6,651,638 describe injecting hydrogen peroxide into the gas stream to oxidize $NO_x$ to nitrogen acids and remove the acids with wet scrubbing.

U.S. Pat. No. 6,523,277 discloses injection of hydrogen peroxide into the exhaust gas and activates it with microwave radiation to oxidize $NO_x$ to nitrogen acids that can be removed with a wet scrubber. U.S. Pat. No. 6,743,404 demonstrates how to decompose $N_2O$ contaminant gas into nitrogen ($N_2$) and oxygen ($O_2$) gases using a group II metal oxide catalyst (CuO and ZnO on $Al_2O_3$).

U.S. Pat. No. 6,612,249 discloses decomposition of $NO_x$ and sequesters mercury and other heavy metals with injection of magnetite in the exhaust gas stream and recovering the product in the ash. U.S. Pat. No. 6,488,740 describes how to use a wet electrostatic precipitator to remove acid gases ($HNO_3$) and coal ash. U.S. Pat. No. 5,843,210 discloses use of an electrostatic spray with scrubber.

Another method of reducing $NO_x$ and $SO_x$ in exhaust gases is to adsorb them on a high surface area bed. U.S. Pat. No. 6,506,351 describes how to absorb $NO_x$ and then oxidize the $NO_x$ compounds with ozone to $N_2O_5$, which can be removed with wet scrubbing during the regeneration cycle. U.S. Pat. No. 6,503,469 describes how to absorb volatile organic compounds and $NO_x$ in exhaust gas on high-silica adsorbent and oxide them with ozone. U.S. Pat. No. 6,066,590 employs a manganese oxide and ruthenium chloride based adsorbent to oxidize $NO_x$ and $SO_x$ to acids, and reacts the acids with an alkali metal (Ca or Mg) to produce a solid salt that remains in the filter.

NSCR methods for mobile combustion sources typically use unburned or oxygenated hydrocarbons, CO, or a reducing agent in the fuel itself to reduce $NO_x$ emissions to $N_2$. As shown in U.S. Pat. Nos. 6,742,326, 5,524,432 and 5,336,476, the fuel/air ratio must be controlled to slip enough reducing agent into the catalyst to allow the $NO_x$ to be reduced to $N_2$. As shown in U.S. Pat. No. 6,725,643, for a diesel engine, water with an amine compound can be emulsified with the fuel to reduce $NO_x$ to $N_2$ in the cylinder. As shown in U.S. Pat. No. 6,682,709 ammonia or cyanuric acid can be injected down stream of the engine and activated by burning additional fuel to decompose the $NO_x$. As shown in U.S. Pat. No. 6,612,249, for a stationary combustion source, iron flakes can be used in the combustion chamber to reduce $NO_x$ to $N_2$ and absorb mercury vapor. As shown in U.S. Pat. No. 6,224,839, $NO_x$ in exhaust gas can be reduced to nitrogen by reaction with an activated carbon bed impregnated with an alkali metal. The technical challenge is preventing excess oxygen from reacting with the activated carbon to produce carbon monoxide.

SCR methods for stationary lean combustion sources normally employ ammonia, $NH_3$, or urea to reduce $NO_x$ emissions to $N_2$. The solid catalyst surface reduces the activation energy required to reduce $NO_x$ with $NH_3$ to produce $N_2$ and $H_2O$ by decomposing $NH_3$ to the $NH_2$* radical or by absorbing $NO_x$ on the surface to react with the ammonia. U.S. Pat. Nos. 5,744,112 and 5,670,444 describe SCR catalyst compositions of a mixture of precious metals deposited on a ceramic support structure. The solid catalyst is selective for $NO_x$ reduction and not for CO oxidation; therefore CO will remain in the exhaust emission. Since the catalytic reaction requires a slight excess of ammonia ion, $NH_3$, compared to $NO_x$ molecules, there is usually a little ammonia slip in the exhaust. The current state of the art for use of $NO_x$ and $NH_3$ slip for high temperature combustion, using a low exhaust gas recirculation and a SCR with or without SNCR system, is about 2 to 3 ppm for $NO_x$ and 5 to 7 ppm for $NH_3$ gases, and for older systems the slip can range from 10 to 25 ppm for both gases. U.S. Pat. No. 6,287,111 uses staged exhaust gas recirculation to reduce NOx generation by employment of a dual-staged burner system. The current state of the art for $NO_x$ generation by means of burners using high exhaust recirculation and low temperature combustion is about 5-9 ppm NOx. Thus, there is still a need for final polishing of the exhaust to reduce ammonia slip and NOx below 1 ppm NOx to create near zero emission combustion sources.

U.S. Pat. No. 6,739,125 discloses use of SCR on a mobile engine while supplying ammonia made from the rich fuel and air mixture.

U.S. Pat. No. 6,730,125 discloses production of ammonia from the hydrolysis of urea and use of the ammonia in an SCR based $NO_x$ treatment process. By injecting ammonia instead of urea, the residence time is reduced in the SCR unit and the $NO_x$ conversion is more complete.

U.S. Pat. No. 6,550,250 demonstrates how to make use of an aqueous solution of urea injected into the hot exhaust gases to make ammonia for an SCR. U.S. Pat. No. 6,146,605 uses a combined SNCR/SCR process where urea is thermally decomposed into ammonia upstream of the SCR.

Another NSCR method uses an ultraviolet photocatalyst to remove ammonia and nitrogen monoxide from atmospheric gases. U.S. Pat. No. 6,566,300 discloses use of titanium oxide on a zeolite carrier as a UV photo-catalyst to decompose ammonia and adsorb NO gas. U.S. Pat. No. 6,562,309 discloses use of a titanium-oxide based, UV photo-catalyst bed to oxidize hydrocarbon fuel vapors.

U.S. Pat. Nos. 6,468,489 and 6,267,940 discloses injection of a UV photo-catalyst powder (powdered SCR catalyst) and ammonia in the exhaust gas, then exposing the exhaust gas mixture to UV light to reduce NOx. The powder catalyst is recovered and recycled. U.S. Pat. No. 6,153,159 discloses use of a UV photo-catalyst fluidized bed to reduce $NO_x$ to nitrogen gas while oxidizing unburned hydrocarbons.

U.S. Pat. No. 6,346,419 uses filtered UV light from a mercury lamp (365 nm band pass filter) to disassociate $NO_2$ to NO for the chemiluminescence's detection.

Another NSCR method uses non-thermal plasma in a catalyst bed to oxidize diesel soot or unburned hydrocarbons to carbon dioxide and reduce $NO_x$ to nitrogen gas, as shown in U.S. Pat. Nos. 6,475,350, 6,038,854 and 5,711,147. U.S. Pat. Nos. 6,395,238 and 6,139,694 demonstrate how to use a non-thermal plasma and ethanol injection to oxidize $NO_x$ to nitrogen dioxide ($NO_2$) gas, which is removed with a wet scrubber as nitric acid ($HNO_3$). U.S. Pat. No. 6,365,112 uses a corona discharge to decompose water vapor and oxidize unburned hydrocarbons, $NO_x$ and $SO_x$ so a wet electrostatic precipitator can remove them. Ammonia or urea can be mixed with the water vapor to help reduce $NO_x$ to nitrogen ($N_2$) gas.

U.S. Pat. No. 6,345,497 uses an electron beam and U.S. Pat. No. 6,030,506 uses a hollow cathode discharge to create atomic nitrogen to inject into the exhaust gas stream to reduce $NO_x$ to nitrogen ($N_2$) and oxygen ($O_2$) gases. The technical challenge for large installations is to mix the atomic nitrogen with the exhaust gas in less than 10 to 14 milliseconds.

U.S. Pat. No. 6,176,078 uses a non-thermal plasma to partially oxidize fuel to create a hydrocarbon based reducing agent for an SCR $NO_x$ reduction system. An oxidization catalyst is used down stream of the SCR to oxidize any hydrocarbons not used to reduce $NO_x$ to nitrogen gas. U.S. Pat. No. 6,117,403 uses a barrier discharge or electron beam to oxidize $NO_x$ and $SO_x$ to acids and then employs a wet scrubber to remove them from the exhaust. U.S. Pat. No. 6,773,555 uses an electron beam to oxidize $NO_x$ and $SO_x$ to nitric and sulfuric acids, neutralize the acids with ammonia gas to make ammonium salts, and then remove the salts with a dry scrubber. U.S. Pat. No. 6,027,616 uses corona discharge and Helium and an oxygen gas mixture to produce $O_2^+$ ions, which oxidize $NO_x$ to nitrogen acids to be removed with a wet scrubber.

U.S. Pat. No. 6,264,899 injected hydroxyl radicals and atomic oxygen upstream and downstream of the combustion process to improve the VOC reduction in a catalytic converter. U.S. Pat. No. 5,154,807 doped the fuel with hydroxyl radicals and zinc and injected hydroxyl radicals downstream of the combustion process to reduce the VOC contamination in the exhaust gas. U.S. Pat. No. 5,807,491 used an electron beam generation of hydroxyl radicals from liquid water to clean VOC's from contaminated water or air. U.S. Pat. No. 6,811,757 uses a dielectric barrier discharge to create hydroxyl radicals and atomic oxygen to remove VOC's in the contaminated air. U.S. Pat. No. 5,236,672 uses a pack bed corona generator to generate hydroxyl radicals and atomic oxygen to inject into a contaminated air stream to reduce VOC's.

U.S. Pat. Nos. 6,682,709 and 4,448,176 use preheated fuel to burn under super lean conditions (equivalence ratio less than 0.6) to reduce VOC and $NO_x$ emissions. U.S. Pat. No. 6,345,495 uses preheated saturated moist air-fuel mixture under super lean conditions and a combustion catalyst to create flameless hydroxyl radical combustion to reduce VOC and $NO_x$ generation by keeping the combustion temperature below 1200 K. U.S. Pat. No. 5,876,195 used a laser to preheat and ignite the fuel charge. U.S. Pat. No. 4,885,065 used an electron or ion bean to sustain combustion under super lean conditions (equivalence ratio less than 0.6) by creating hydroxyl radicals from the fuel and oxygen in the combustion zone. U.S. Pat. No. 5,487,266 used flame spectroscopy to adjust fuel mixtures to lower flame temperatures to reduce the $NO_x$ emissions without causing flame out in the gas turbine.

None of the above techniques provide the unusually effective method of $NO_x$ reduction and simultane oxidization of combustion contaminants (CO and/or $C_xH_xO_x$) which are now afforded by the present invention.

SUMMARY OF THE INVENTION

It is a major object of the invention to provide apparatus and method that avoids the above process and technique limitations, and the subject of this invention addresses the need for a cost effective, readily adaptable and more efficient alternative to existing processes for controlling $NO_x$, combustion contaminants, and $NH_3$ slip emissions from effluent gas streams. The subject process is herein referred to as the Controlled Spectrum Ultraviolet Radiation Emission Reduction Process, (SUVR). The new invention is capable of achieving superior $NO_x$ reduction performance using the $NH_3$—$NO_x$ chemical reaction while virtually eliminating excess $NH_3$ emissions plus separately or in combination with NOx control, destroys combustion contaminants/VOC.

The invention basically comprises an SUVR method for reducing or substantially eliminating oxides of nitrogen ($NO_x$) from an effluent gas stream between 300-800° K and that contains oxygen gas ($O_2$) by reacting $NO_x$ with the amidogen radical ($NH_2^*$) to form to harmless nitrogen gas ($N_2$) and water vapor ($H_2O$), the method including the steps:

a) providing a source of ultraviolet radiation with sufficient output between 180 nm and 220 nm and preferably in the range of 193 to 206 nm associated with a duct containing the effluent stream, or streams, b) mixing ammonia or an ammonia-based reagent with said stream, upstream of said ultraviolet radiation source so that the variance is within +15%/−5% of stoichiomatic concentration, c) causing said ultraviolet radiation source to irradiate the stream with effective wavelength band and intensity flux sufficient to dissociate the ammonia molecules ($NH_3$) to the amidogen radicals ($NH_2^*$) and to excite and dissociate $NO_x$ molecules to promote the ($NO+NH_2^*$) to ($N_2+H_2O$) reduction reaction.

It is further an objective of this invention to reduce either independently or in combination with $NO_x$, a class of compounds generally referred to as "combustion contaminants and or VOC's". Combustion contaminants include hydrocarbon compounds called unburned hydrocarbons, carbon monoxide, (CO), and combustible solids. The term "Combustion-contaminants" is used in the industry to describe by-products of a combustion process that are formed by the imperfect combustion of fuels and which are known intrinsic air pollutants and/or smog precursors. They are comprised of a combination of carbon monoxide (CO), and partially burned fuel that may be in an aerosol or gas state, or combination thereof but generally exclusive of methane.

In the matter of reducing NOx emissions, the SUVR process, like the SNCR, SHR, or SCR processes relies on the use of an ammonia based reducing reagent such as anhydrous or aqueous ammonia, urea, or other chemical that yields ammonia gas ($NH_3$) in the effluent stream. Also, just as in the current art, the reagent may be injected into the effluent gas stream by means such as by wall nozzles, injector grids, venturi plate, or lances for carefully matching the $NO_x$ concentration in the effluent stream with the supplied or produced $NH_3$ gas. This injection stage may utilize static mixing devices, multiple injection headers, or other techniques to affect uniform $NH_3$—$NO_x$ distribution. But the present SUVR process differs from the SNCR, SHR, or the SCR processes in that means is applied to achieve reaction of the $NH_3$ with the $NO_x$ gases after the reagent has been effectively administered to or dispersed in the effluent stream. Promotion of the $NH_3$—$NO_x$ interaction involves the use of a controlled spectrum ultraviolet energy source that emits a high intensity energy flux in the form of ultraviolet rays with carefully prescribed wavelengths between 180 nm and 280 nm and having sufficient intensity to dissociate virtually all $NH_3$ to $NH_2^*$+H and $NO_2$ to NO*+O passing through the ultraviolet light. The dissociated $NH_3$ or exited state Amidogen radical ($NH_2^*$) reacts with $NO_x$ to form $N_2$ and $H_2O$, the present process more efficient at dissociating the $NH_3$ gas and electronic exciting $NO_x$ for promotion of the $NH_2^*$—$NO_x^*$ chemical reaction than the methods employed by the SNCR, SHR, and the SCR processes. The present SUVR process is a photo-catalytic gas-phase reaction typically does not require a catalyst bed as is associated with the SCR process, and thereby avoids the aforementioned limitations and disadvantages.

The present SUVR process can be applied at any practical temperature consistent with the long-term reliability of the radiation source or emitters, and method of application. By avoiding need for high thermal temperatures as are associated with the SNCR process, the SUVR process overcomes the efficiency limitations caused by the high temperature reaction chemistry. To reduce $NO_x$ gases, the SUVR process is applied to gas temperatures below 800° K but is more efficient at the lower end of this temperature range because the reaction, $NH_2^*$+NO=$N_2$+$H_2O$, is exothermic below about 500° K.

Typically, a system and method is provided for photo-catalyzing the oxidation of ammonia to nitrogen gas. A radiation source such as UV light, LED's or lasers is employed and controlled to deliver a consistent radiation flux with a spectrum that is between about 180 nm and 280 to convert $NH_3$ to exited state Amidogen radical ($NH_2^*$), which reacts with $NO_x$ to make $N_2$ (nitrogen gas) and $H_2O$ (water vapor). Adding atomic lines between 190 nm and 200 nm to the UV radiation spectrum is also used for the photolysis of water vapor, $H_2O$, to OH*+H radical which reacts with CO to make $CO_2$ and $H_2$.

It is an objective of the invention to very efficiently and effectively reduce $NO_x$ gases in effluent gas streams while also preventing the release of residual ammonia, consisting of the following steps:

a) providing a source of ultraviolet radiation associated with a duct passing said effluent stream, b) adding an ammonia-based reagent to the stream, upstream of the ultraviolet radiation source, and, c) controllably operating said ultraviolet radiation source to irradiate said stream flowing in the duct, to effect reduction or substantial elimination of $NO_X$ by promoting a chemical reduction reaction of ammonia with the $NO_X$ to produce $N_2$ and $H_2O$.

The method typically includes controlling the rate of an ammonia-based reagent added to the effluent gas stream. The objective is to achieve a stoichiometric concentration of reduction of the NO, $N_2O$ and $NO_2$ reactions to minimize un-reacted ammonia molecules. The stream may be sampled, upstream of and downstream of the locus of UV radiation, to determine, in real time, the correct amount of ammonia to add to the effluent gas stream.

Although the present SUVR process precludes the need for injecting the reagent into high temperature gases, such as used by SNCR or SHR processes, or the need to use a catalyst bed such as in the SHR and the SCR processes, the process can be applied to effluent streams that are already using these processes to enhance their efficiency. Combustion equipment utilizing SNCR, SHR, or SCR and that are experiencing or might soon experience $NH_3$—$NO_x$ chemistry limitations as described above, can be retrofitted with the SUVR process to achieve greater $NO_x$ control and eliminate $NH_3$ emission problems.

For retrofit applications, the SUVR process is typically installed downstream of the aforementioned processes and no modifications to the reagent injection system would be required. The ammonia based reagent needed by the SUVR process would be furnished by the upstream SNCR, SCR, or SHR process in the form of ammonia that slips by the upstream process. The amount of this residual ammonia is therefore adjusted to match the residual $NO_X$ by adding more ammonia if necessary so there will be sufficient ammonia available in the effluent gas stream to maximize NOx reduction by the added SUVR process. Therefore, it is an object of the invention to provide a best mode method for reducing or substantially eliminating NOx and $NH_3$ slip emissions from a combustion device or chemical process system that is already using NSCR, SCR, or SHR.

An objective of the invention as applied for $NO_x$ control is to control the wavelength and/or intensity of said radiation source to dissociate substantially all of the ammonia added into said stream without creating any additional byproducts or promoting the ammonia and molecular oxygen, $O_2$, reaction. There is a second order effect with effluent gas temperature, in that, the ammonia loss increases and the amidogen, $NH_2^*$, reaction rate decreases as the temperature approaches 220° C.

It is also an object of the invention as applied for $NO_x$ control to include the effective and thorough mixing of ammonia added into said effluent stream, prior to irradiation. As will be referred to, FIG. 15 shows the typical ammonia mixing plumes formed from the use of conventional lances or wall nozzles. Field measurements show that there are lean and rich zones of ammonia gas formed by this injection approach even after the effluent gas has traveled through a segment of the boiler tube section. FIG. 16 shows the uniformly mixed ammonia plume using a venturi jet mixing plate. The venturi's can be round, square, or hexagonal shaped and they usually have 92-95% pressure recovery in typical field installations. For effluent gases with a high exhaust temperature (230-520° C.), FIG. 17 demonstrates the use of swirl inducers to uniformly mix the ammonia plumes generated from the decomposition of aqueous urea. The liquid water in the drops from the nozzle injectors vaporizes to cool the exhaust gas while the urea salt decomposes into ammonia and carbon dioxide gases which diffuse into the exhaust gases. The swirl inducers mechanically mix the gases to reduce the diffusion mixing timing.

In the case of exhaust gases with aerosols of sulfates, ash, worn pieces of catalyst, or VOC's, the use of UV elements or bulbs may require mechanical protection to prevent buildup of dirt on the element. The dirt layer on the element absorbs the UV light, thus reducing the UV output to the exhaust gas stream. FIG. 12 demonstrates the use of electrostatic field to cause the particles to collect on the chevrons. This is the same principle use in a dry electrostatic precipitator. In fact, FIG. 11 demonstrates the installation of the SUVR process in a wet electrostatic precipitator to polish the residual $NO_x$ and CO. For heavy ash laden exhaust gases such as from coal or coke combustion, FIG. 13 demonstrates the use of electrostatic field plus a clean air knife at the base of the UV element. The cooler clean air layer expands as it travels up the UV element, which provides some net gas movement away from the surface to overcome the diffusion rate of the particles. The electrostatic field provides the second line of protection by providing a net force to draw the particles toward the wall of the dry electrostatic precipitator.

It is also a further objective of this invention to also provide the capability by use of controlled spectrum radiation to destroy VOC's. VOC's are organic compounds that are smog precursors and that may be released from combustion processes or more generally from coating or cleaning operations that rely on solvents in such processes. These pollutants may be of concern by regulatory authorities as well as $NO_x$ and combustion contaminants and it maybe desired to destroy these pollutants along with reducing the aforementioned pollutants from the effluent gas stream. In some cases, depending on the specific nature of the atmospheric pollution in an air quality region, combustion contaminants and VOC's may actually be of greater concern than $NO_x$, and in such case the SUVR process can be tailored to exclusively reduce these pollutants by the proper control of the wavelength of the UV source. A subset of photochemical radiation within the 180 nm to 280 nm bandwidth of the SUVR process is applied for that purpose. The method of destruction of the combustion contaminants and VOC's includes creation of hydroxyl radicals (OH), atomic oxygen, (O), Ozone ($O_3$), and Hydroperoxyl radial ($HO_2$) from ultraviolet photolysis of water vapor ($H_2O$) and molecular oxygen ($O_2$) contained in the exhaust gases. The controlled UV source causes the VOC molecule to be oxidized by the excited radicals into more water vapor ($H_2O$) and carbon dioxide ($CO_2$). As the oxidation process continues the new water molecules undergo photolysis and make more hydroxyl radicals (OH), which increases the reaction rate. As shown in FIG. 1c, the formyl radical (HCO), which is a product of VOC oxidation, is also an important oxidation chain reaction maker for VOC's. For very effective destruction of heavy VOC loading (greater than 200 ppm) in the effluent gas stream, the SUVR process can be split into two stages where the first stage ultraviolet spectrum has high output in the 180 nm to 200 nm band and the second stage ultraviolet spectrum has high output in the 192 nm to 210 nm band for final hydroxyl radical clean up. For light VOC loading (less than about 90 ppm), the second stage is used for polishing.

It is another object of the invention to change the properties of the UV source to function above 220° C. so that the process can be applied to gas streams at elevated temperature; and to control the wavelength of radiation to between about 180 and 280 nanometers, for most efficient operation for destruction of combustion contaminants and VOC's.

Yet another object of the invention is to apply the UV source to the duct in such a manner as to effectively irradiate 100% of the effluent gas stream passing through the duct efficiently and cost effectively. For example, in the case of small ducts, the radiation source could be in the form of elongated tubular UV emitters or string of UV LED's. Or as shown in FIG. 5 for medium and large ducts, a laser such as ArF laser@193 nm scans the duct at kHz rates, which is faster than the gas velocity in the scan volume. The laser beam has a deeper penetration into the exhaust gas than the lamps; therefore, the beam can convert the entire ammonia concentration to the amidogen radicals with each slice scan. The amidogen radical reaction with the $NO_x$ molecule is gas diffusion limited, thus the reaction can be complete within 30 cm of gas flow if the ammonia concentration is well mixed.

An electron beam is usable to scan the duct to create hydroxyl radicals from water vapor and atomic oxygen from the molecular oxygen for VOC oxidation to carbon dioxide and $SO_2$ gas oxidation to sulfuric acid. Since ammonia and water vapor have similar electron cross-sections in the exhaust gas, the percent concentration of the water vapor in the exhaust gas overwhelms the parts-per-million concentration of the ammonia, thus, as shown in FIG. 1c, NO is oxidized by the hydroxyl radical to $NO_2$ or $HNO_3$ during the oxidation of the VOC's. But, as shown in FIG. 1b, the higher oxides of nitrogen are reduced to NO after exposed to the correct UV band of light, which in turn reacts immediately with any amidogen radical. If ammoniated water vapor/liquid is scan with an electron beam or exposed to UV light or dielectric barrier discharge before mixing with the exhaust gases, the amidogen radical can be directly injected into the exhaust gases for reaction with $NO_x$, as shown in FIGS. 6 & 14.

The tubular means may include multiple tubular emitters orientated in the duct in the most cost effective way to achieve the desired intensity and redundancy. In the case of very small ducts, the most cost effective means may be to use one or more tubular UV emitters in an axial orientation to the direction of gas flow so that the contaminated gases will pass alongside the emitter(s) and in the duct space extending about the emitter(s). If economical, UV LEDS's can be used as the UV source for small to medium sized ducts. But tubular emitters are readily available and economical to apply. Tubular emitters can be arranged in a cross flow configuration in either a radial or longitudinal pattern. In the case of very large ducts, the use of excimer or ion lasers, as the ultraviolet radiation source would be more cost effective and more practical.

These and other objects and advantages of the invention, as well as the details of an illustrative embodiment, will be more fully understood from the following specification and drawings, in which:

DRAWING DESCRIPTION

FIG. 1c shows important radical reactions controlling the oxidation of VOC's, reduction of nitrogen oxides, $NO_x$, and the production of the amidogen radical;

FIG. 4a uses two UV lamp banks while FIG. 4b uses an amidogen generator for the roughing stage;

Figure 7:
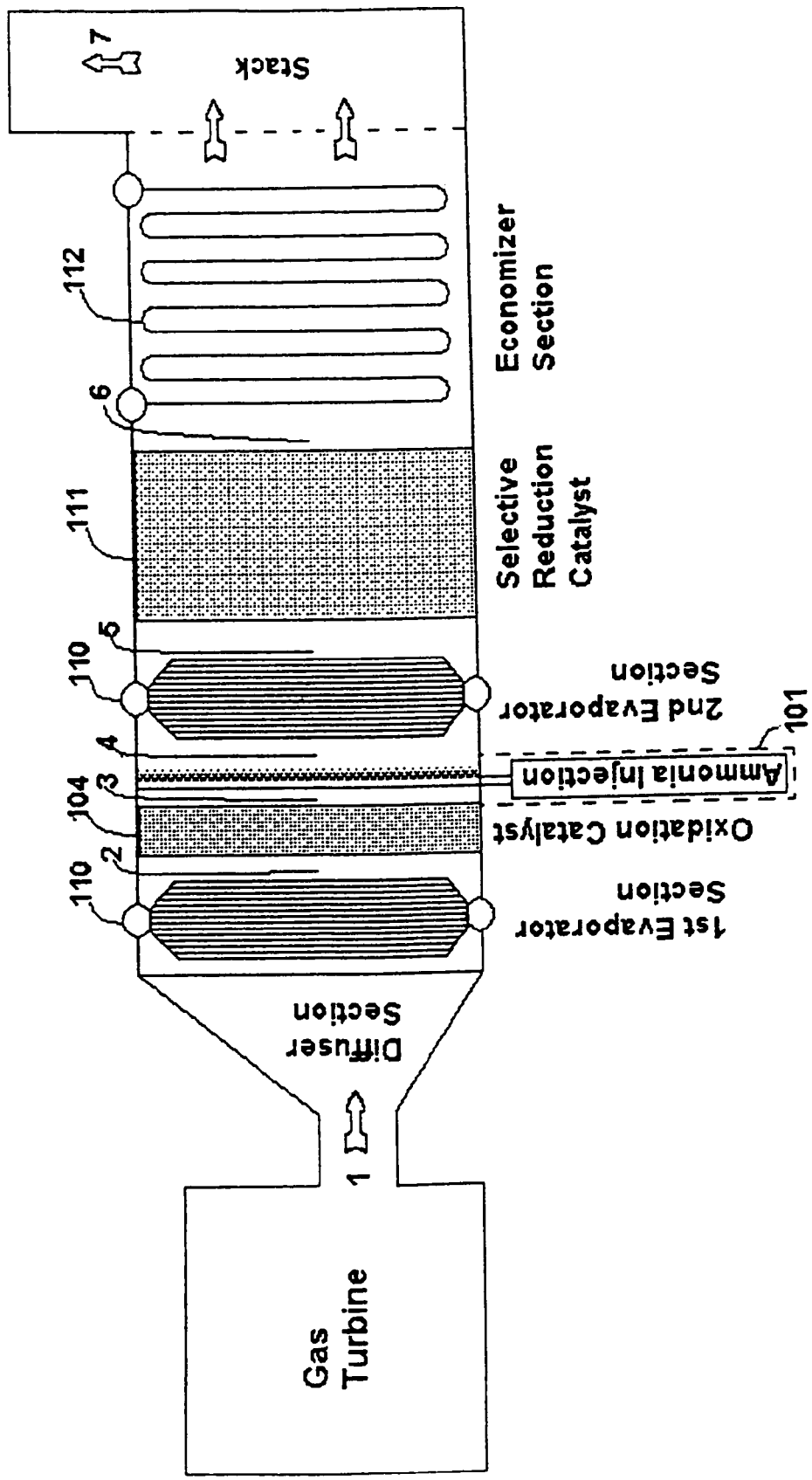
Figure 8:
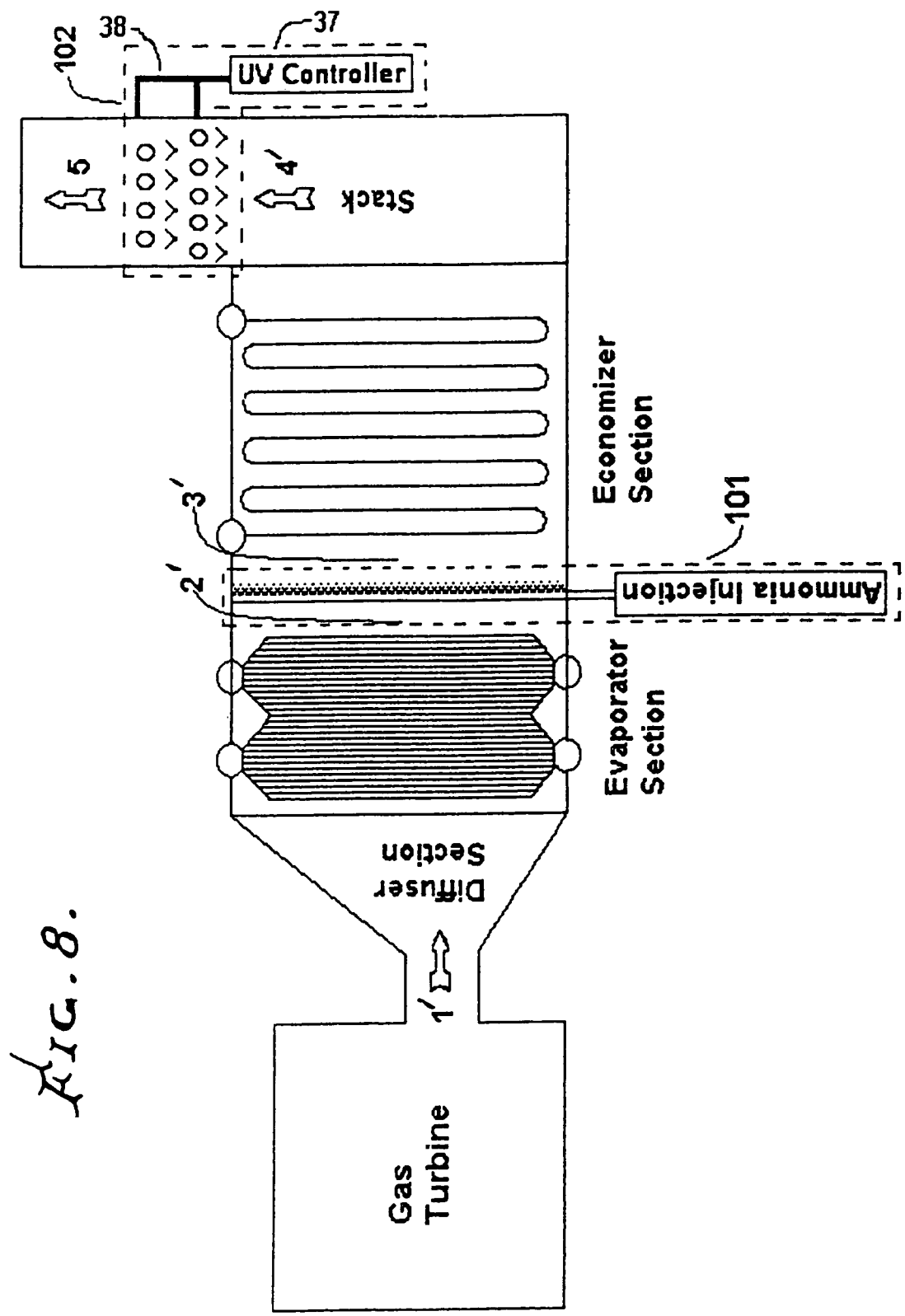
Figure 9:
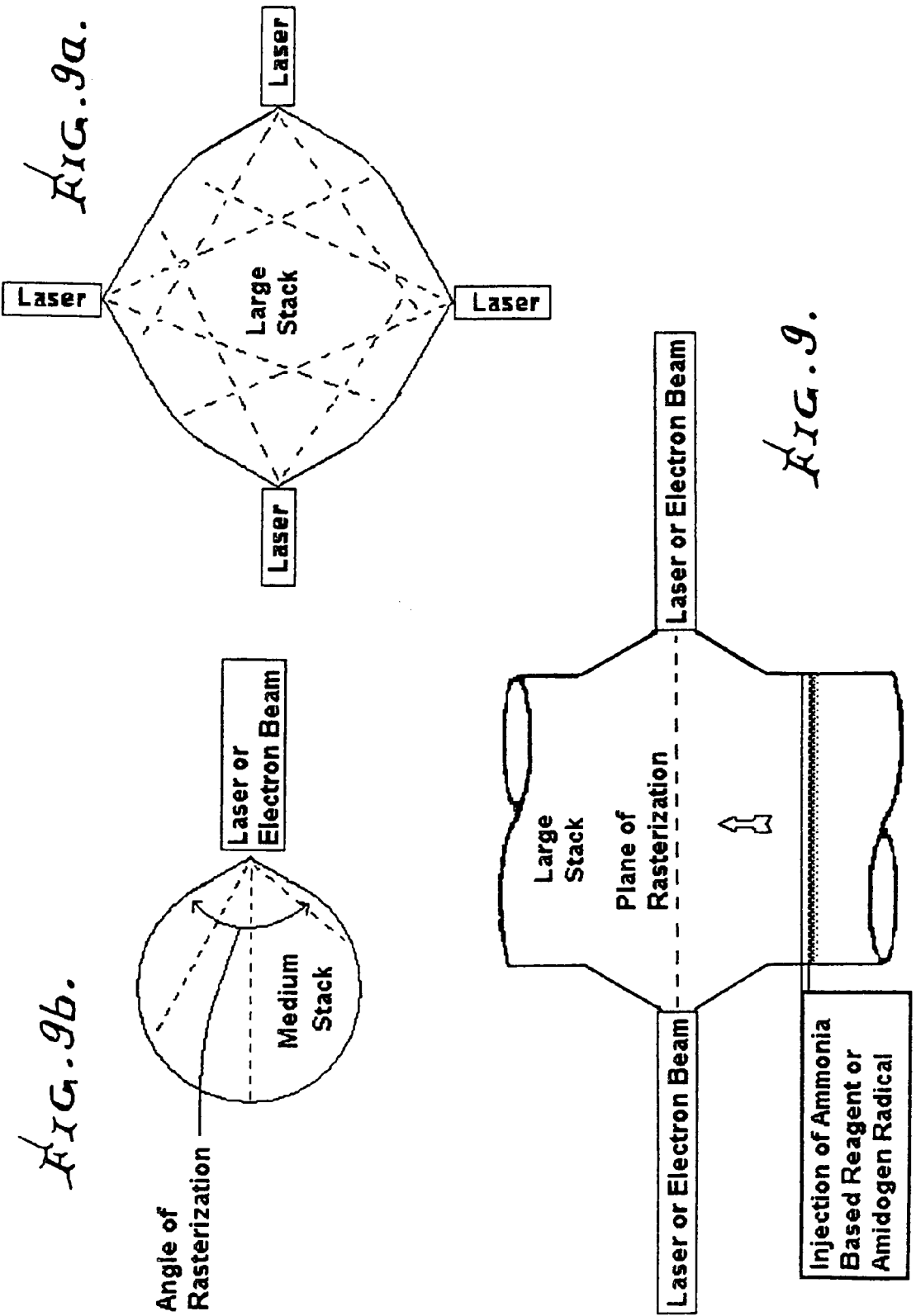
Figure 10:
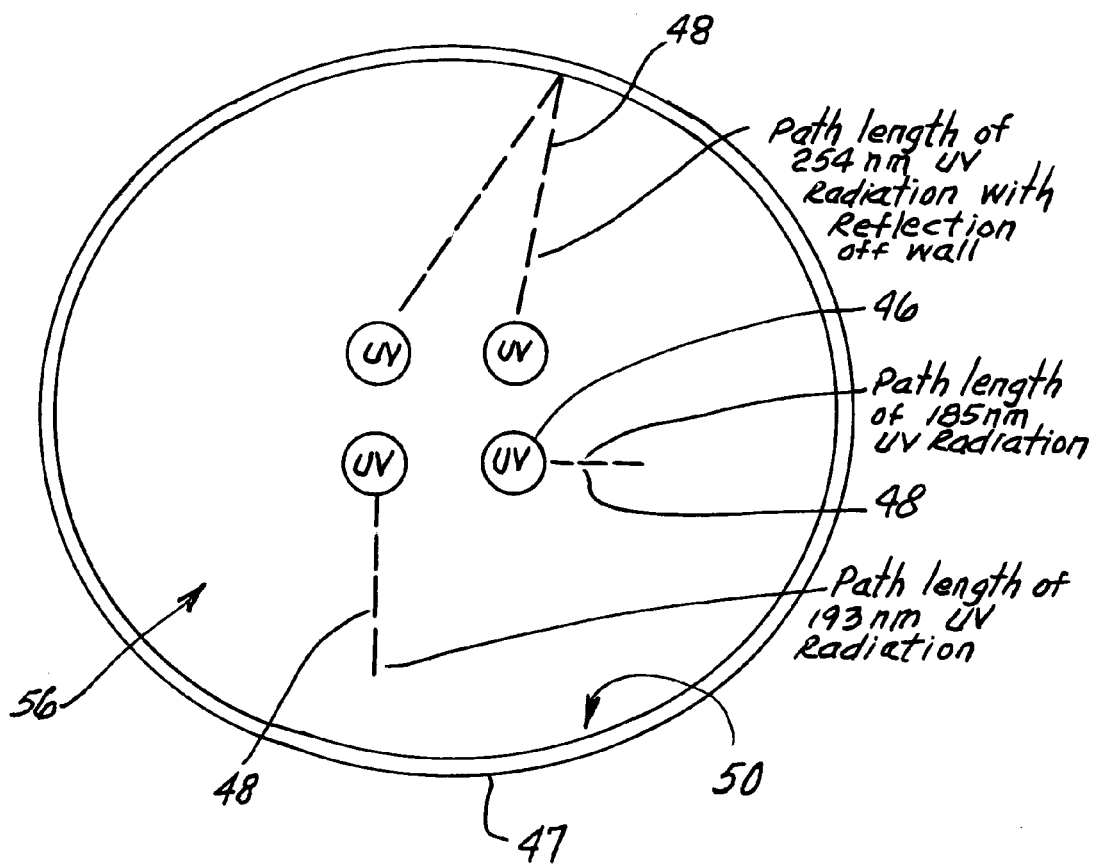
Figure 10A:
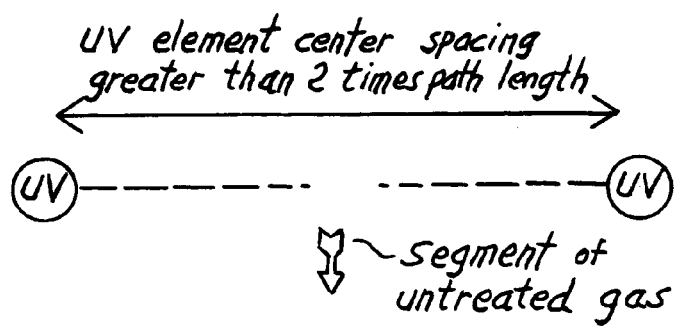
Figure 11B:
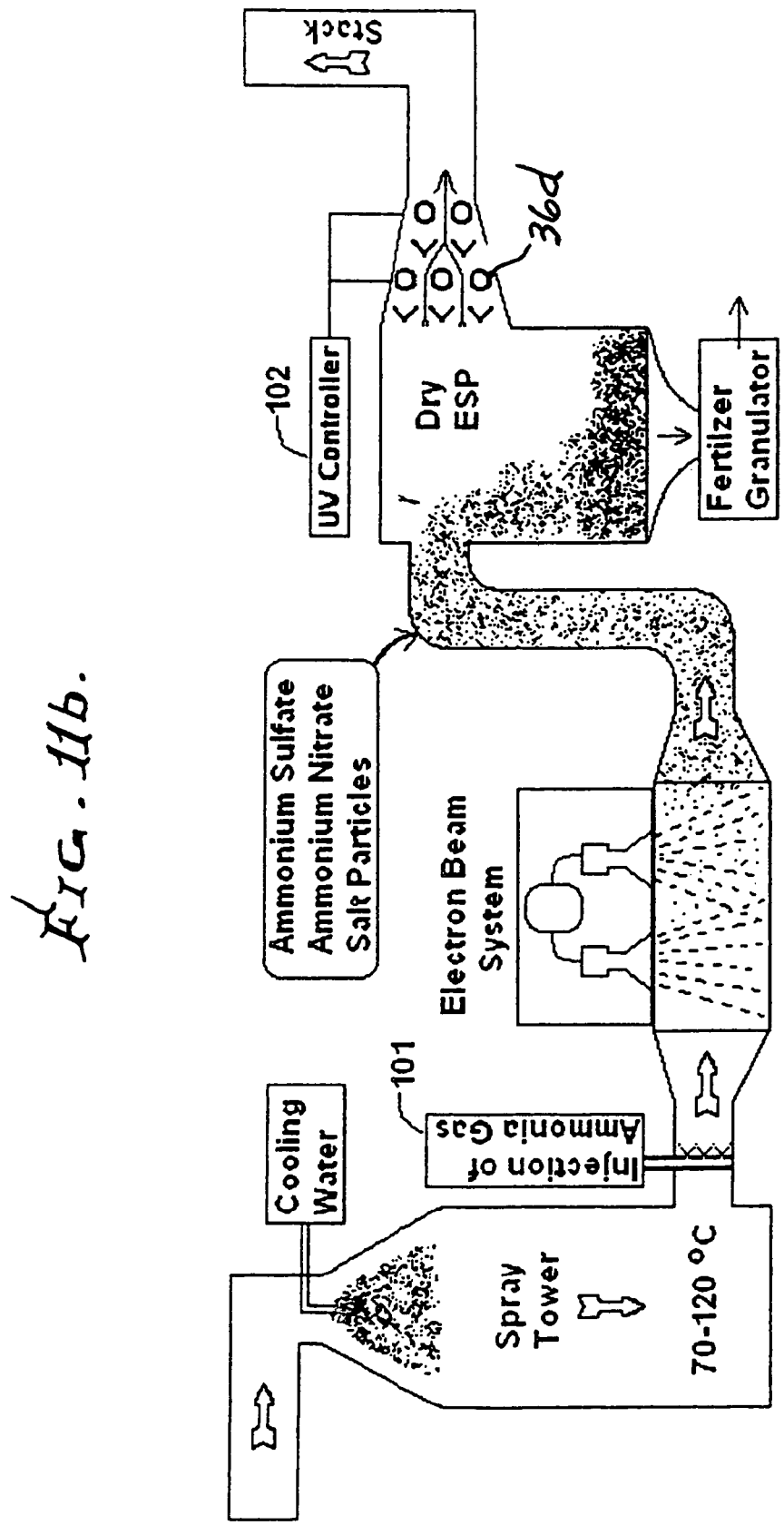
Figure 14C:
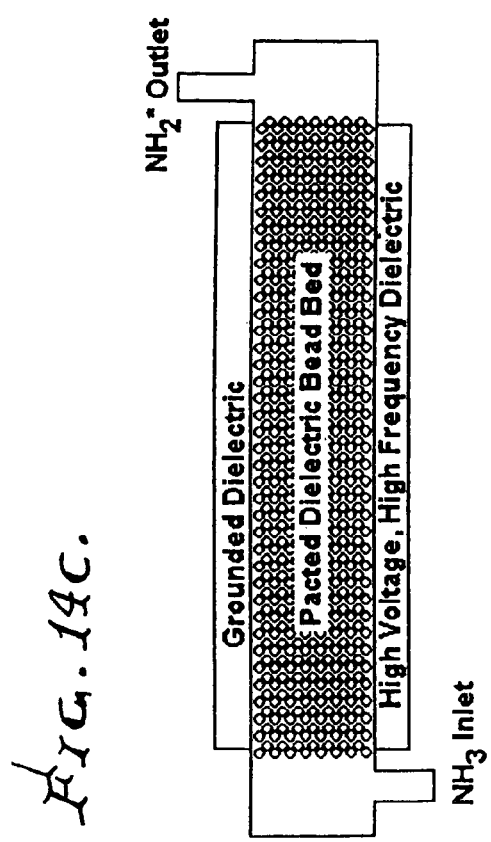
Figure 14D:
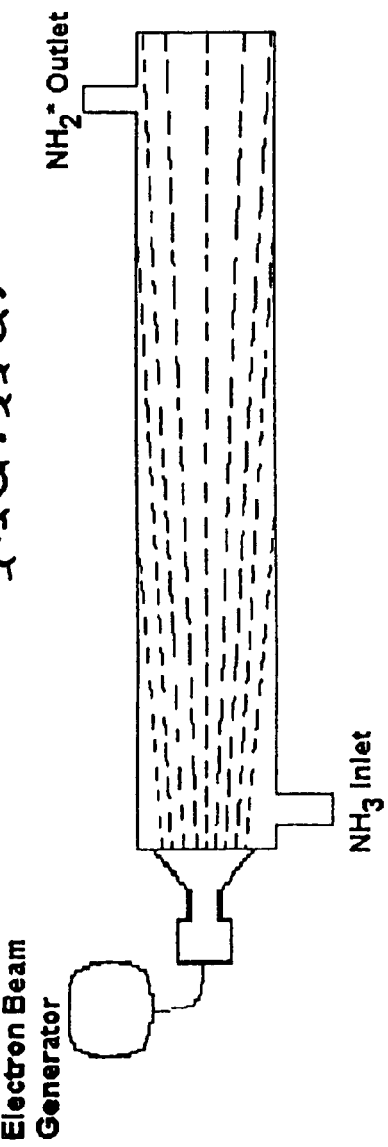
Figure 15:
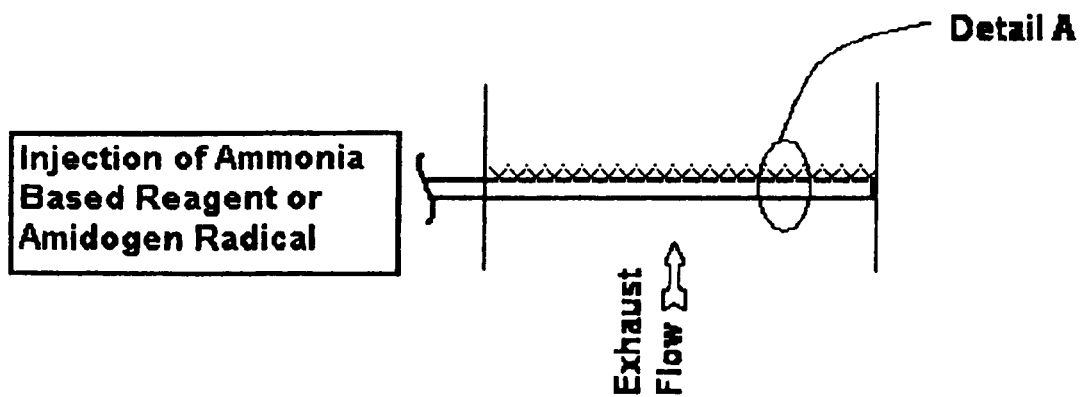
Figure 15A:
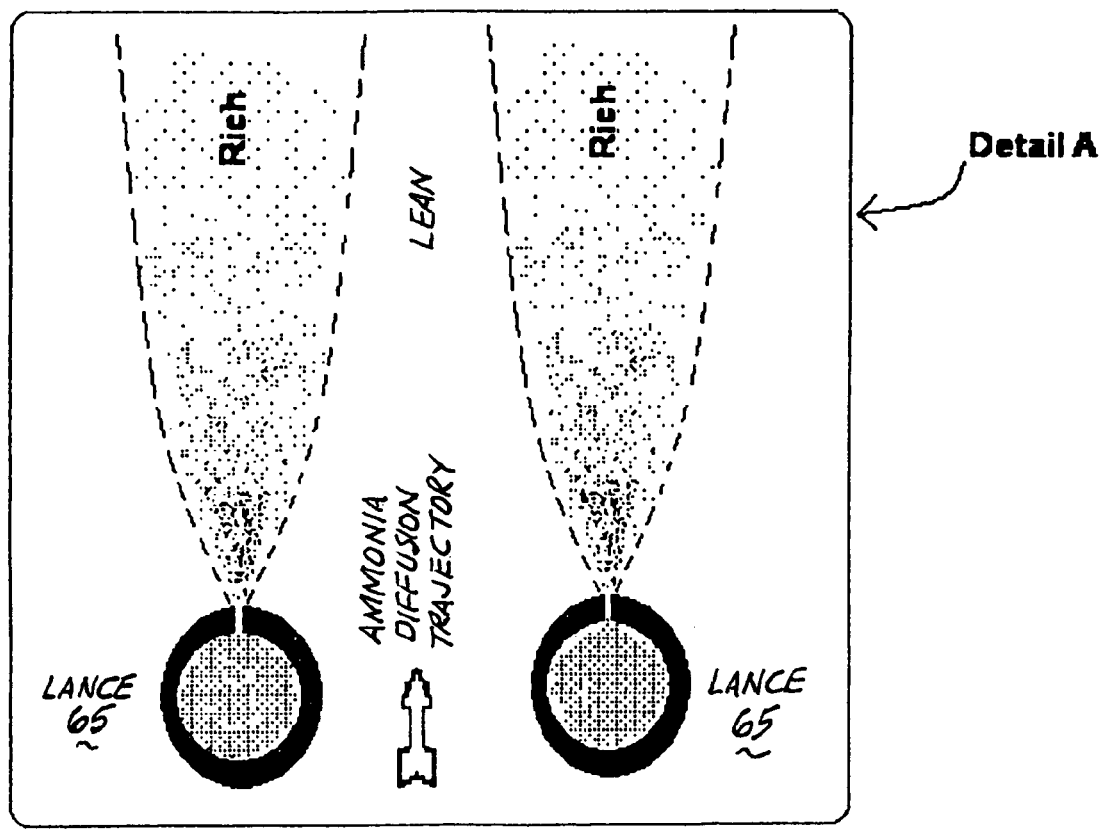
Figure 16A:
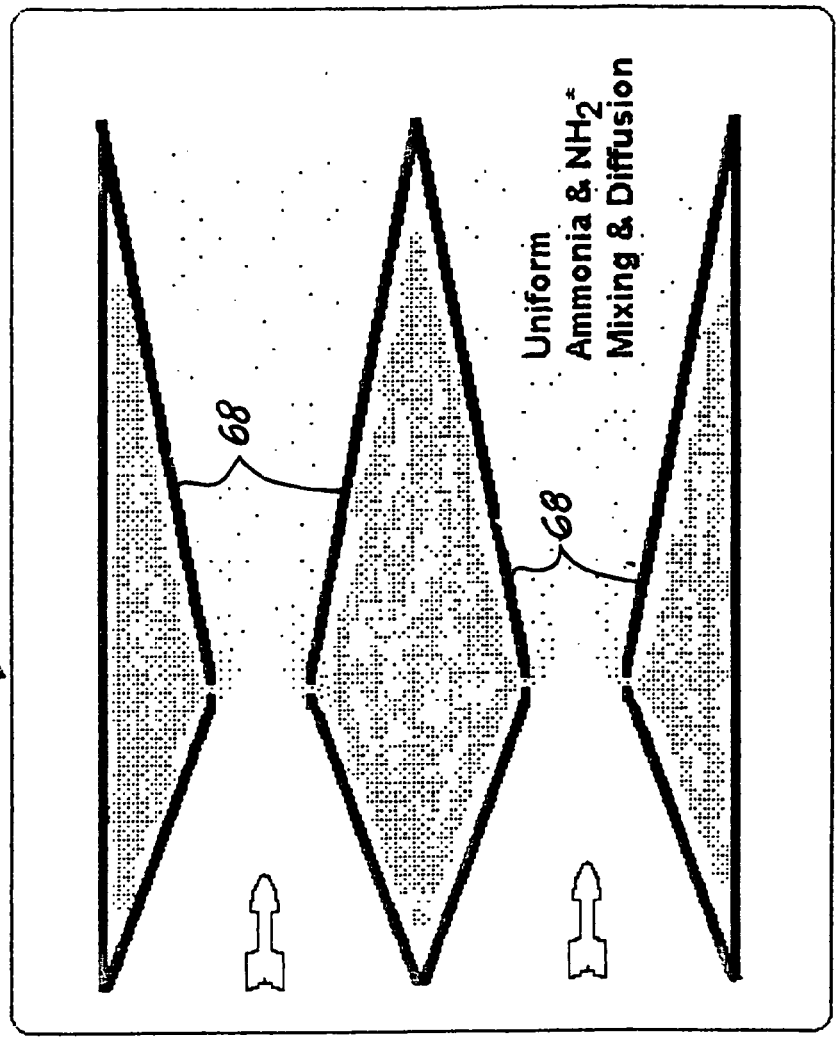
Figure 16:
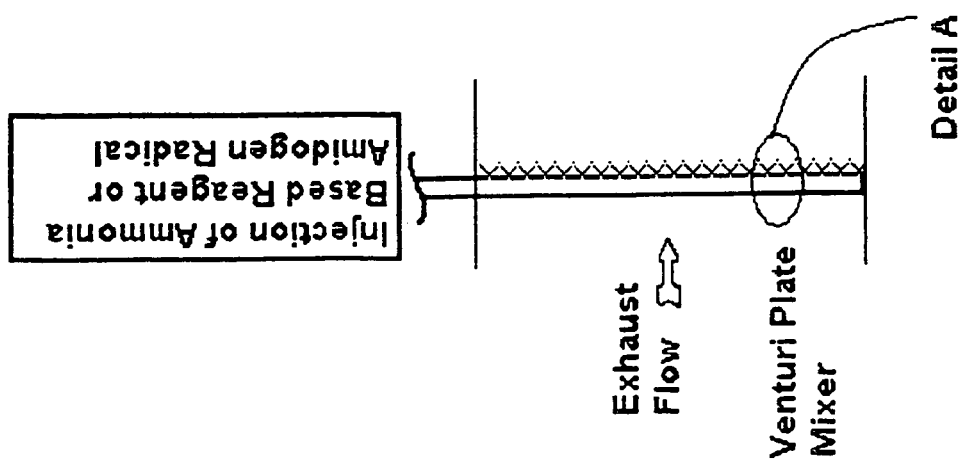

FIG. 7 shows a typical gas turbine co-generation system where ammonia is injected in the evaporator section and the SCR is installed before the economizer section. The combustion catalysis is installed before the ammonia injection system. Note, there is additional pressure drop between the turbine exhaust and the stack with the large catalyst bed sections and some reduced heat transfer in the evaporator section due to separation of components;

FIG. 8 shows a typical gas turbine co-generation system where the SUVR system is installed. Note, the evaporator section is continuous and waste heat recovery unit has a smaller footprint and weight. The pressure drop between the gas turbine exhaust and stack is now limited by the boiler tube section;

FIGS. 9, 9a, and 9b show a the SUVR system for medium to large stacks using a laser to promote amidogen radical generation or electron beam to promote oxidation of VOC's and CO;

FIGS. 10 and 10a show the relative transmission lengths of the useful ultraviolet atomic radiation lines from a low pressure mercury vapor lamp. The transmission path length is a function of the wavelength and composition of the exhaust gas. It is important that the exhaust gases flow through the active area, therefore, the UV elements are stacked in stagger matrix to prevent by pass of gases;

FIG. 11a shows the combination of the SUVR and a wet electrostatic precipitator to clean the ash, $SO_x$, $NO_x$ and ammonia slip from the exhaust gases. Note the ultraviolet lamps can replace the dielectric coated electrodes used in the wet electrostatic precipitator;

FIG. 11b shows the combination of a dry electrostatic precipitator downstream from an electron beam system. The SUVR is used to polish the ammonia and nitrogen oxide slip from the electron beam process. The ultraviolet light can help charge the aerosol particles for attraction to the chevrons to complete the polishing the sulfate salt slip;

FIG. 12 shows the high voltage, high frequency cathode charge on the ultraviolet bulb or LED array with chevrons providing mechanical protection to direct particle impact on the transparent surface. The electrons impact the surface of the particle and charge the surface so the particle is attracted to the grounded chevron;

FIGS. 13 and 13a show the annular nozzle injection of clean gas around the ultraviolet light bulb to provide a particle free boundary layer on the transparent surface. The high voltage, high frequency cathode charge on the bulb or LED array provides additional protection in dirty exhaust gas such as from a coal or wood combustion, smelter or cooking grill;

FIGS. 14a-14d show the various amidogen generators using ultraviolet bulb or LED arrays, dielectric barrier electric discharges using a metal electrode and packed bead bed, or electron beam generation to excite the injected ammonia gas;

FIGS. 15 and 15a show the ammonia diffusion trajectory from typical lance or wall nozzle injection. The coarse injector spacing causes ammonia rich and lean concentrations in the exhaust gas;

FIGS. 16 and 16a show the near uniform ammonia diffusion trajectory from a venturi plate injector. The venturi has 95% pressure recovery for mixing ammonia gas at twice actual open duct velocity. Uniform ammonia mixing allows the ultraviolet catalyzed NH2—NOx reaction to happen in the millisecond time scale or within 10 to 14 inches space scale.

Figure 2A:
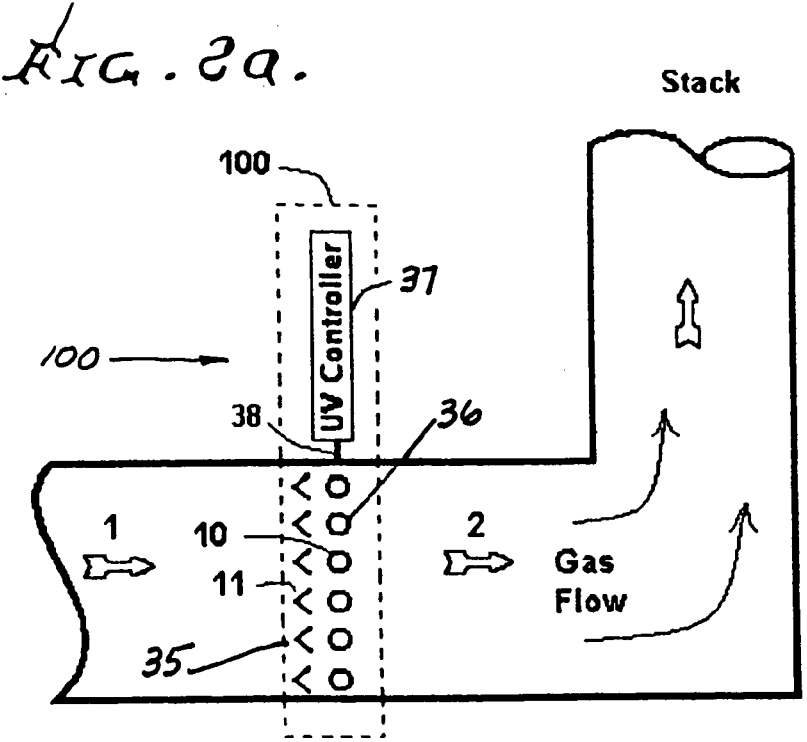
FIG. 2a depicts a typical section of gas ducting showing ultraviolet emitting tube cluster, and UV controller for the destruction of combustion contaminants and/or VOC's.
Figure 17A:
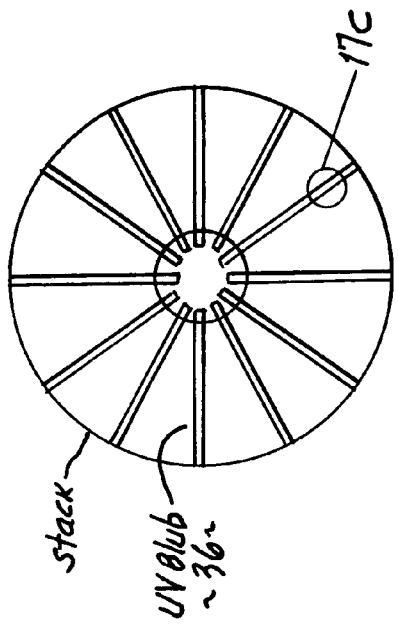
Figure 17C:
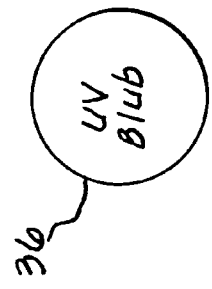
Figure 17B:
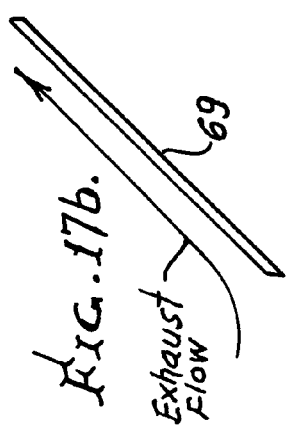
Figure 17:
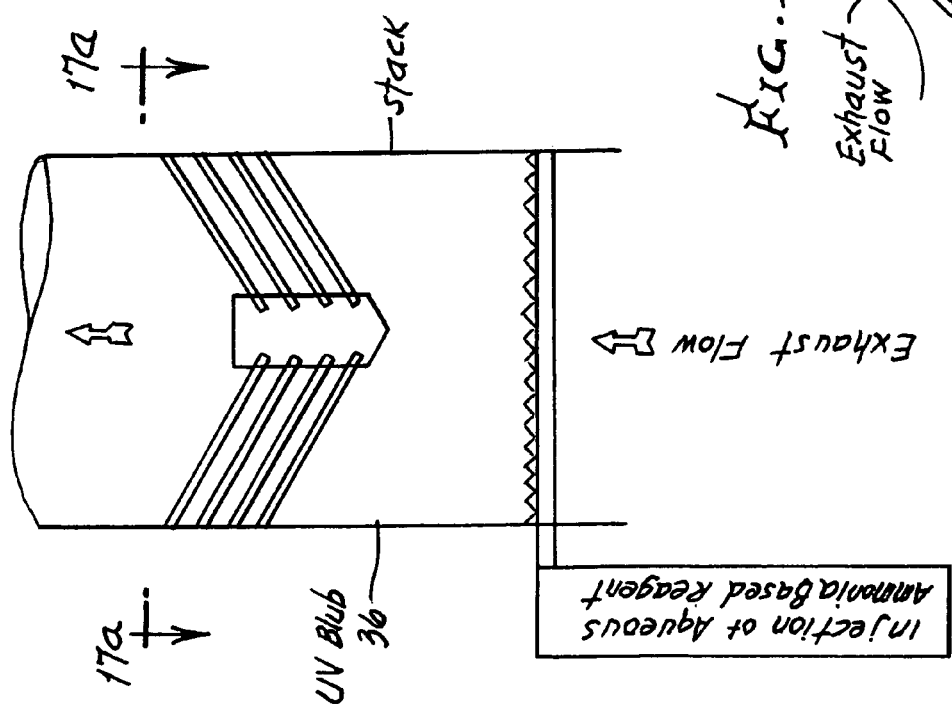
Figure 18A:
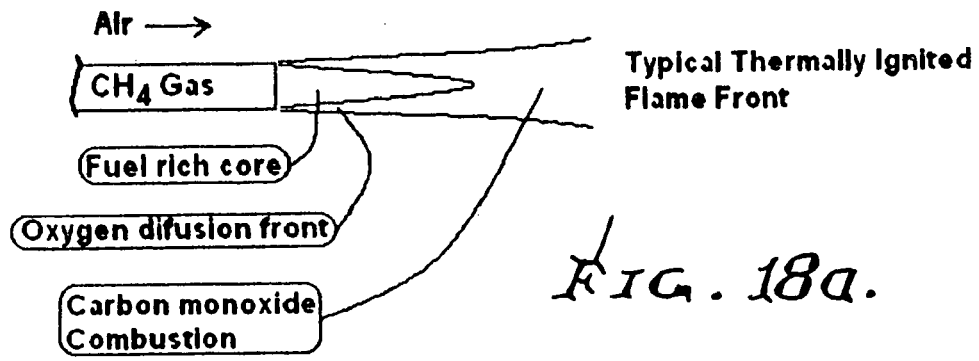
Figure 18B:
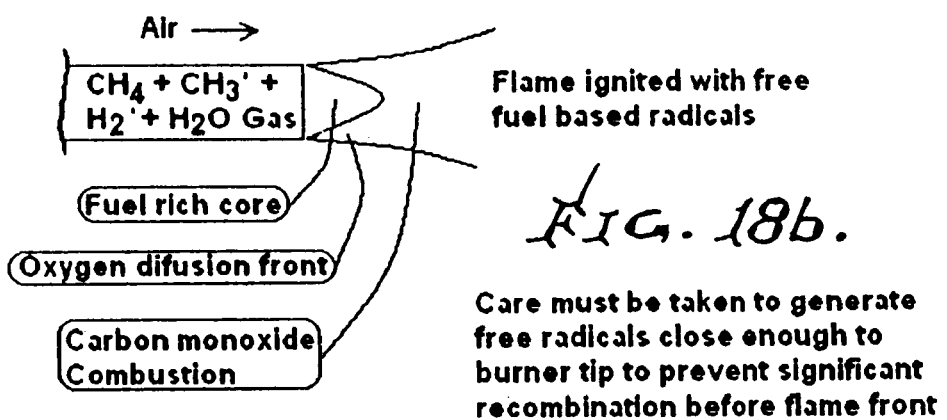
Figure 18C:
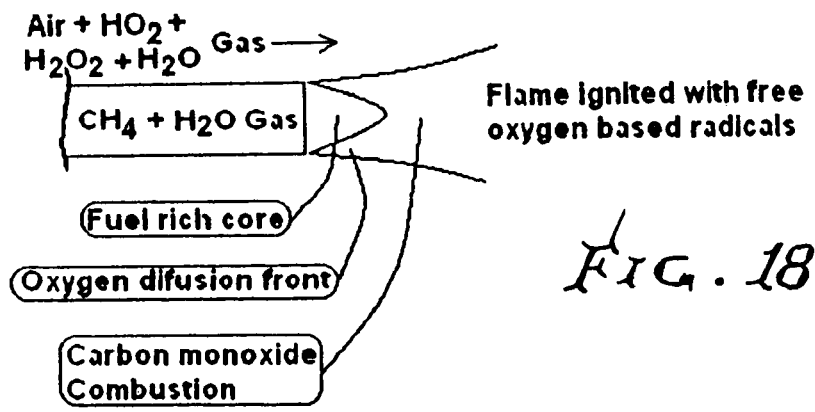

FIGS. 17-17c show the SUVR process for high temperature exhaust stacks where urea is decomposed to ammonia upstream of the ultraviolet light array. The swirl inducers help mix the ammonia in the exhaust gases;

FIGS. 18a-18c show the application of free radical enhanced combustion to reduced VOC generation by the combustion process. Instead of using free radicals downstream of the burner as shown in FIG. 2a, the free radicals are g generated at or near the burner tip to complete the combustion reactions;

FIG. 19 demonstrates the SUVR process for a spray painting, coating operation, drying operation or cleaning operation where there is a significant release of solvent vapors in the air. An optional ammonia injection system can be used to capture the halogen acid created during the oxidation of halogenated VOC's; and FIG. 20 demonstrates the SUVR process for a portable unit for removing VOC's from local atmospheres in closed spaces.

DETAILED DESCRIPTION

Figure 1A:
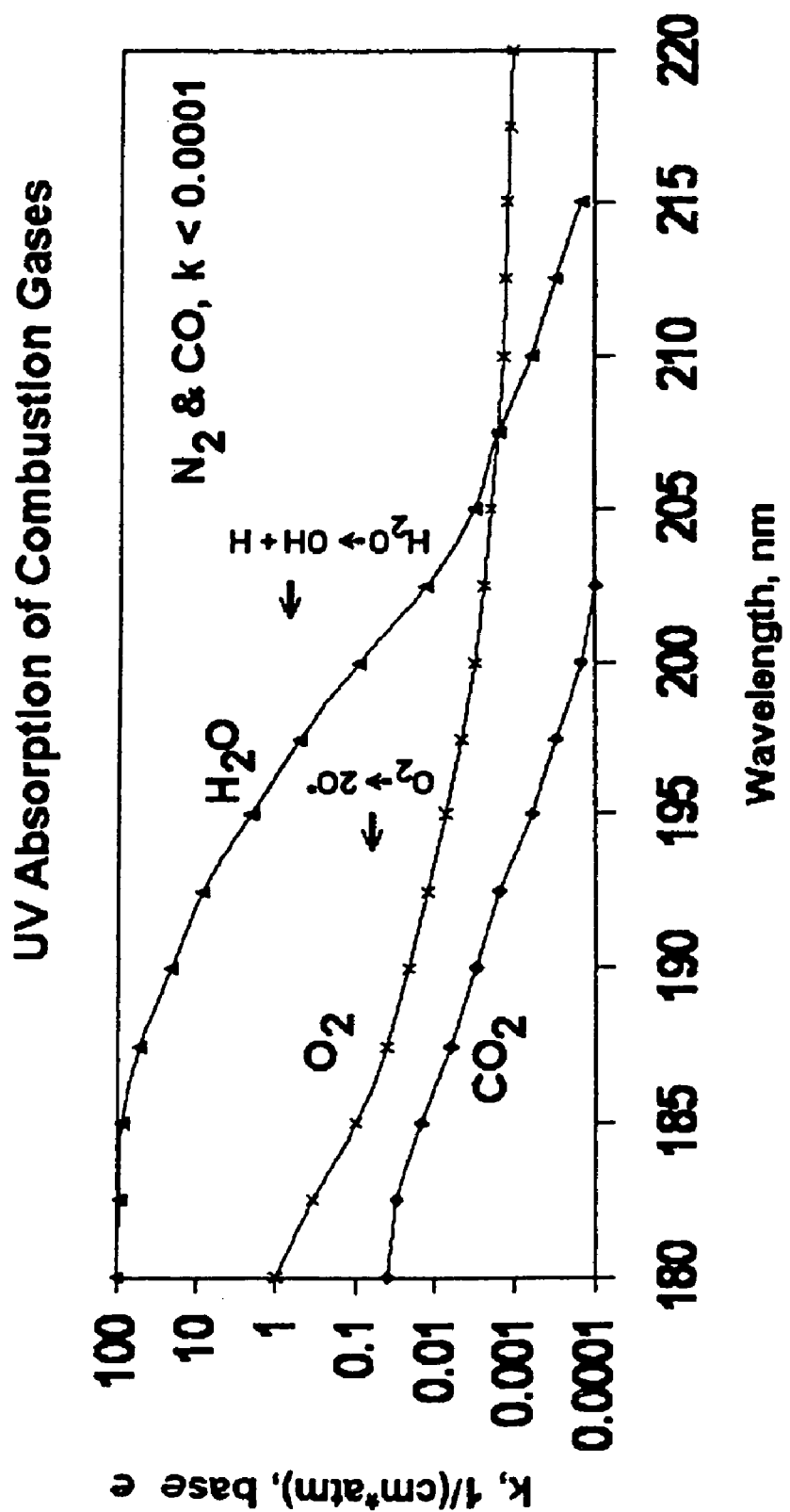
FIGS. 1a & 1b are diagrams of the spectral UV radiation bands that promote the controlled spectrum radiation reduction of $NO_x$ and destruction of combustion contaminants and/or VOC's.
Figure 1B:
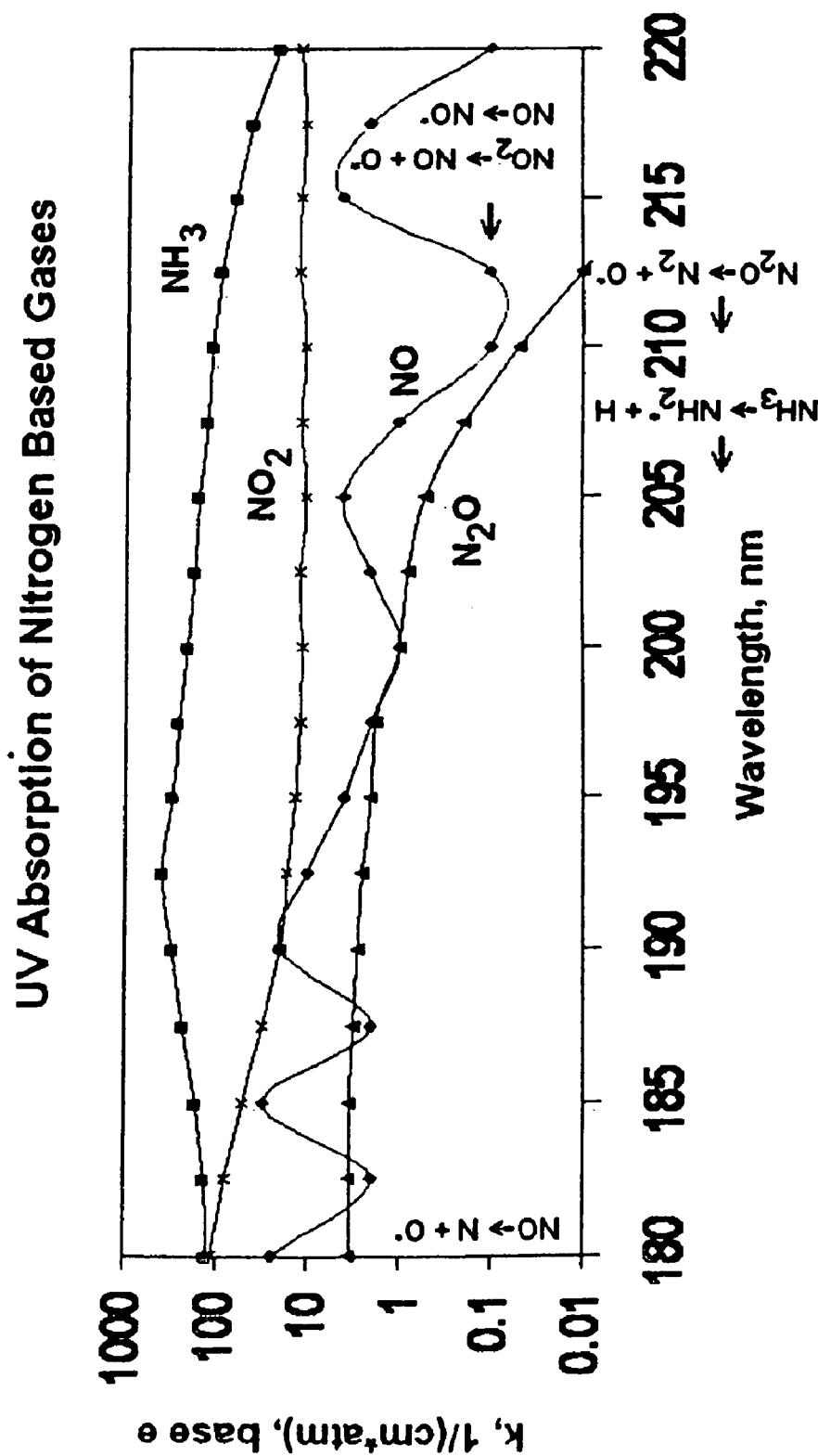

Referring first to FIGS. 1a, 1b, and 1c, the controlled spectrum ultraviolet radiation source is controlled to a narrow wavelength range to achieve the desired pollution control of the pollutants of concern in the effluent gas stream. FIG. 1a is a plot of UV absorption curves for combustion gases showing that the absorption of UV energy by water vapor ($H_2O$) becomes very significant at wavelengths less than about 190 nanometers. At wavelengths less than 190 nm, the production of atomic oxygen and/or ozone is possible, which in turn increases the amount of reducing agent needed for the $NO_x$ reduction process and can create additional NO contamination if the ammonia concentration is depleted. Since most combustion gases that contain $NO_x$ and combustion contaminants also contain water vapor, the control of these pollutants by UV energy becomes very inefficient below this wavelength of 190 nm. FIG. 1b is a plot of absorption energies for selected nitrogen based gases of concern with regard to the pollution control of $NO_x$. FIG. 1b shows that the most practical range for using UV energy to reduce $NO_x$ is between about 190 and 207 nm. Longer wavelengths become increasing less effective in dissociating $NH_3$ into $NH_2^*$ and the absorption of UV energy by the $NO_x$ molecules declines. FIGS. 1a and 1b together demonstrate that the most effective range of wavelengths for controlling $NO_x$ emissions in most combustion gases is between about 190 nm and 207 nm, with peaks at 192 to 195 nm and again at 203 to 207 nm. FIG. 1a also demonstrates the most effective range for VOC's oxidation is between about 180 nm and 190 nm and that the oxidation phase must be in advance of the addition of the reducing agent. FIG. 1c lists the important secondary reactions that occur in the SUVR process.

FIG. 2a shows an effluent gas, such as from a combustion device or a chemical process and containing combustion contaminants/VOC's flows at 1 to an oxidizer 100 where they are oxidized and purified effluent gases leave the reactor at 2. The oxidizer containing ultraviolet radiation emitters 10 with wavelength between 180 nm and 280 nm and optional erosion shields 11 to irradiate the effluent gas or gases, or mixture. The erosion shields 11 can be applied if the effluent gases are flowing at high velocities and may contain solid particles that reduce the life of the UV emitters 10. The number and design of said UV emitters will be tailored to the type and magnitude of the combustion contaminants or VOC's present in the effluent gas stream and the desired destruction efficiency. In the presence of water vapor, sulfur dioxide and nitrogen dioxide have a high probability that they will be converted to sulfuric and nitric acids with oxidization from the hydroxyl radical. Particle shields 35 are used in FIG. 3a as a dry electrostatic precipitator to combat the ammonium salt generation from the acid gas reactions. A radiation source controller is electrically connected at 38 to the emitters 36 is used in FIG. 2a to control the wavelength and intensity of the radiation to the desired values to optimize the oxidation reactions. A controller for such radiation source to maintain the correct wavelength is indicated at 37.

Figure 2B:
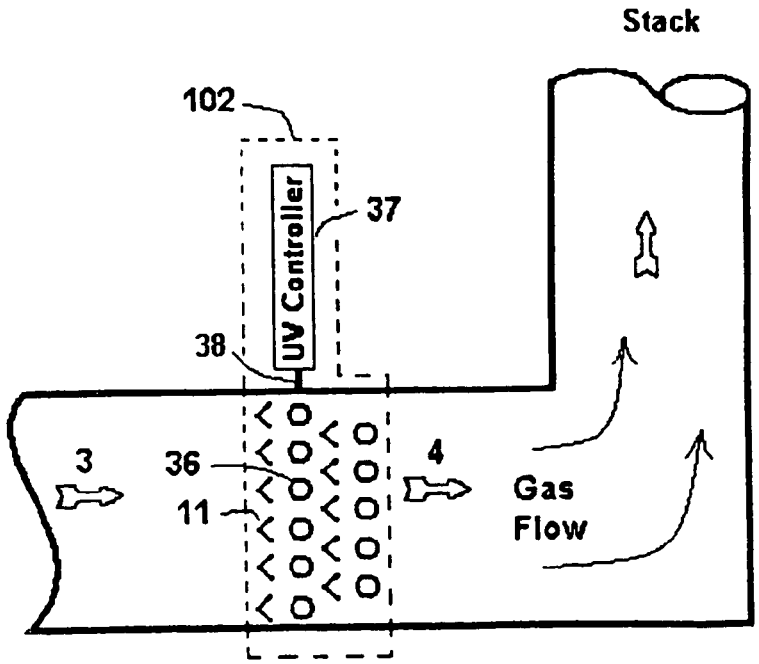
FIG. 2b depicts a typical section of gas ducting showing ultraviolet emitting tube cluster, and UV controller for the polishing of ammonia slip and reduction of nitrogen oxides.

FIG. 2b shows a similar apparatus 102 used for polishing $NO_x$ and residual $NH_3$ emissions from upstream SNCR, SCR, or SHR processes. For this application of SUVR, the wavelength of the UV source 36 is controlled to the range of 190 nm to 207 nm to achieve efficient $NO_x$ reduction chemistry and efficient residual $NH_3$ destruction. A UV controller 37 as in apparatus 100 is used to control the wavelength and intensity of the energy source.

Figure 3A:
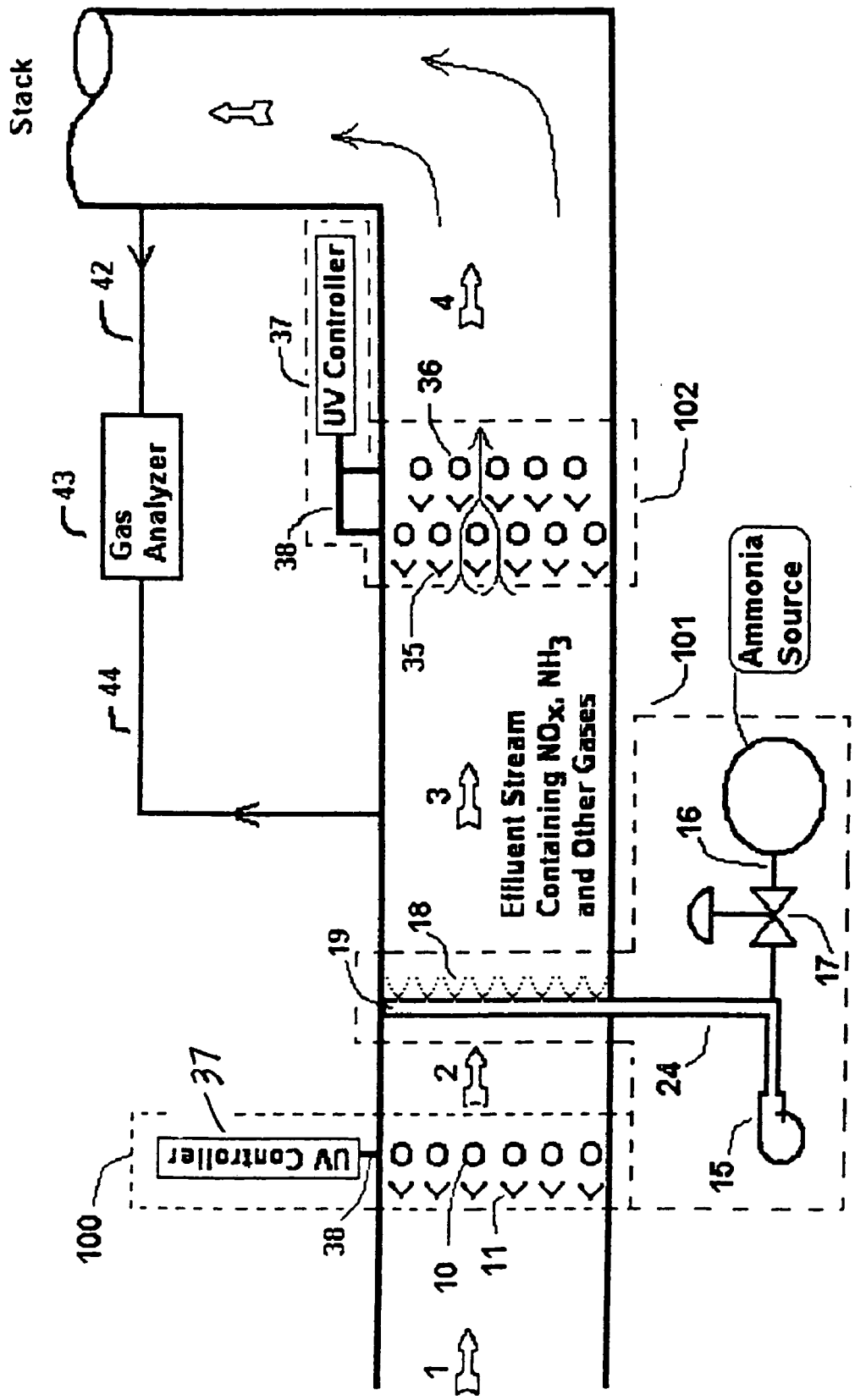
FIG. 3a is the combination of FIGS. 2a & 2b with the addition of an ammonia based reagent. The PLC control of the ammonia rate and the UV output is based on the gas analyzer output of upstream and downstream monitoring of $NO_x$ and $NH_3$ concentrations.
Figure 3B:
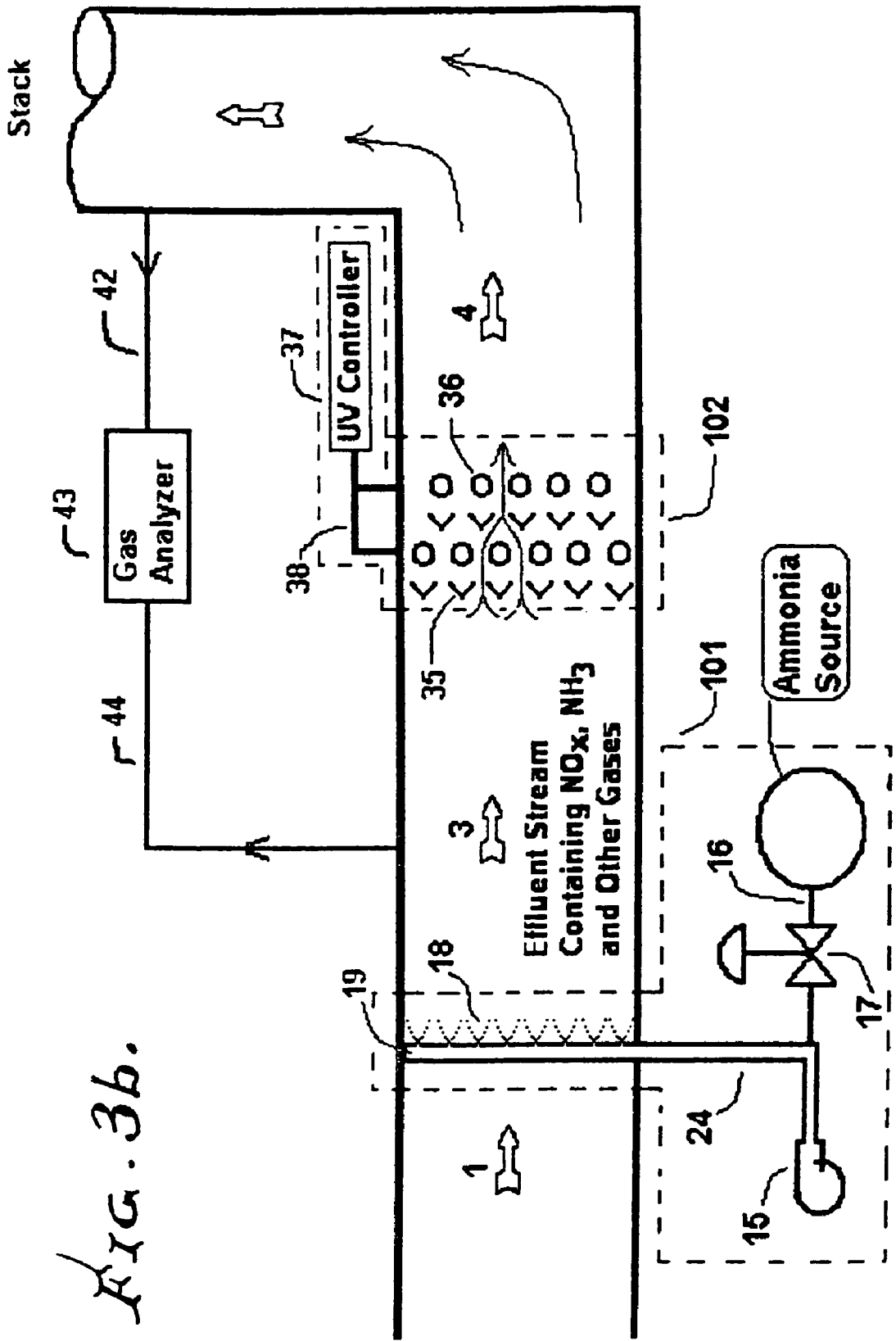
FIG. 3b shows FIG. 2b with the addition of an ammonia-based reagent. The PLC control of the ammonia rate and the UV output is based on the gas analyzer output of upstream and downstream monitoring of $NO_x$ and $NH_3$ concentrations.

FIG. 3a combines apparatus 100 as shown in FIG. 2a and apparatus 102 as in FIG. 2b with the addition of apparatus 101 for adding $NH_3$ based reagent for applications where there is no upstream SNCR, SHR, or SCR process. FIG. 3a is applied when it is desired to treat gases for the removal of combustion contaminants/VOC gases and also $NO_x$ gases and FIG. 3b is applied when it desired to treat only for the $NO_x$ gases. Effluent gas 1 flows through the oxidizer 100 where it is cleansed of combustion contaminants/VOC's to 2 as in FIG. 2a and then through reagent injection apparatus 101 where it is mixed with a $NH_3$ based reagent and to 3 where it contains a mixture of reagent and $NO_X$ and flowing to $NO_X$ treating apparatus 102. A $NH_3$ based reagent such as anhydrous or aqueous ammonia, or urea is controllably supplied at 16 by means of a pump or control valve 17 and mixed with a carrier gas such as fresh air or recycled flue gas by means of a control valve or blower 15, to the reagent stream 24, and flowing into injector-mixer 19, and injected into the effluent gas stream at 18.

In apparatus 102 gases flow into optional erosion shields 11 and around UV elements 36 as described in FIG. 2b for the photochemical reduction of $NO_x$ and destruction of residual $NH_3$. Purified gases leave the $NO_x$ reactor 102 at 4 and are expelled out a stack or used for other purposes. Output flow at 4 may be sampled as via line 42 and sampler or analyzer 43, whereby the mixture of input gases at 3 may be varied as by control of $O_2$ and $NH_3$ inputs, as at 19 to achieve maximum reduction of $NO_x$ and least consumption of the reagent. See also sampling line 44 connected to the input line at the input side of the apparatus 102, and extending to the analyzer 43 for comparison of $NO_X$ input and $NO_x$ outputs, aiding in optimal use of $NH_3$ based reagent.

Figure 4A:
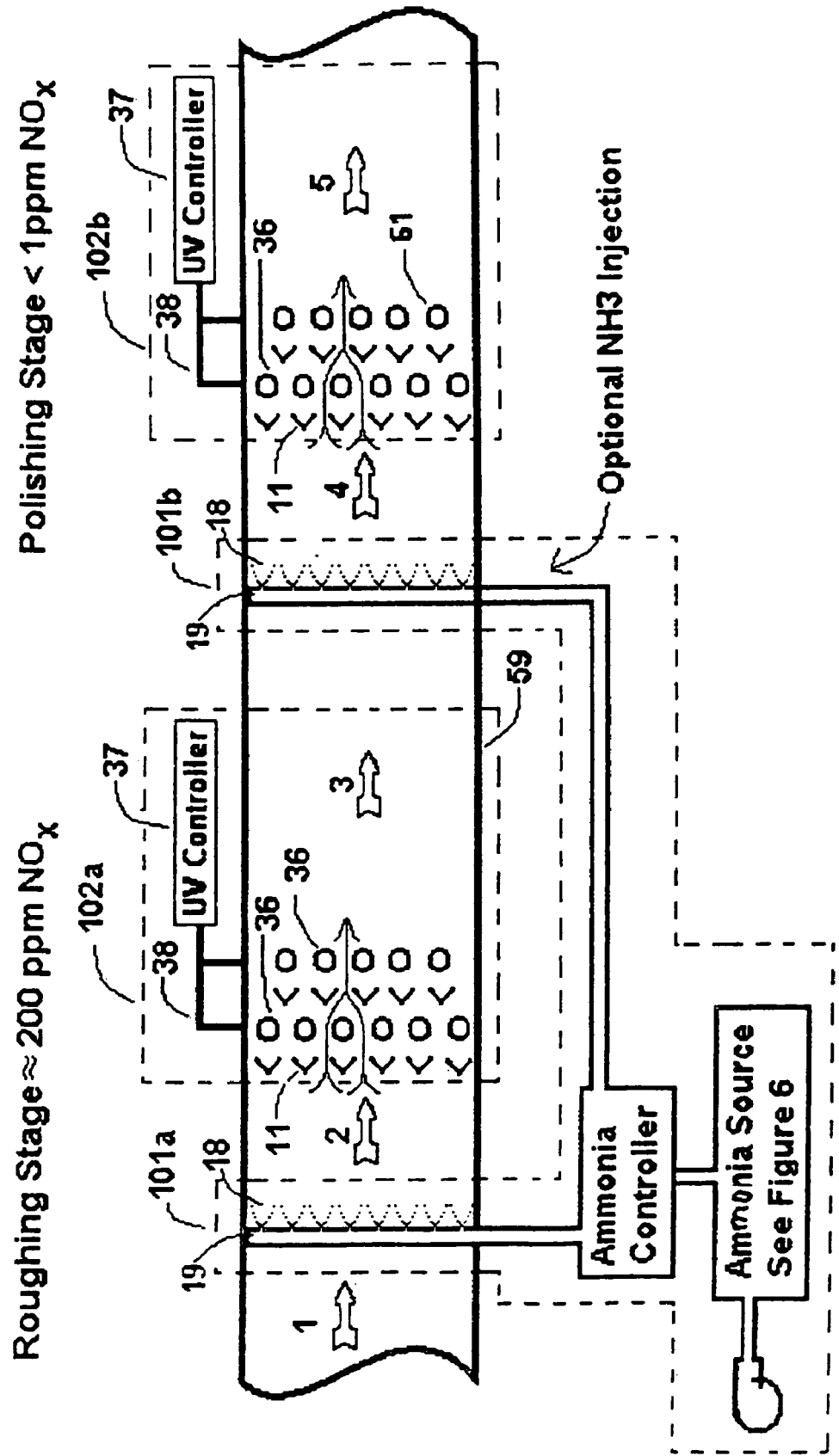
FIGS. 4a & 4b are views like FIG. 3b, but showing use of a two stage process where NOx levels can be reduced by more than a factor of 1000.
Figure 4B:
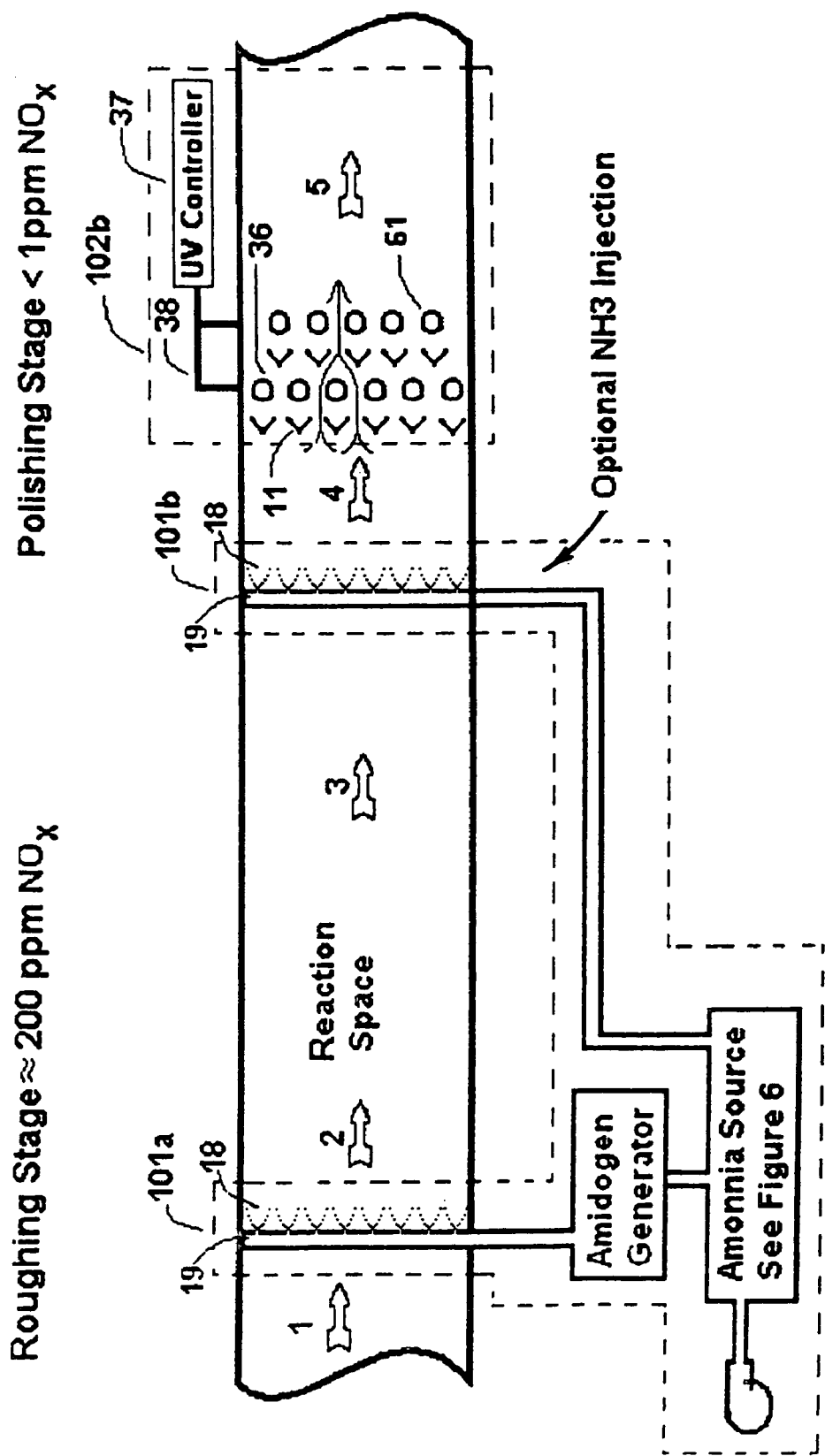

FIGS. 4a & 4b are schematics of a two-stage application of SUVR for achieving very efficient reduction of very high concentrations of $NO_x$ gases in effluent gas streams. FIG. 4a is comprised of a first stage reactor 102a followed by a second stage reactor 102b whereas FIG. 4b is comprised of a first stage amidogen generator 101a followed by a second stage reactor 102b. Effluent gases containing very high concentrations of $NO_x$ at 1 pass through a reagent injection apparatus 101a such as depicted in FIG. 3a where the gases are mixed with a $NH_3$ based reagent and to 2 where the gas mixture flows into $NO_x$ treating apparatus 102a. Apparatus 102a reduces most $NO_x$ gases in an initial stage of NO control and purified gases at 3 that need additional control enter a secondary reagent injection apparatus 101b which introduces more $NH_3$ based reagent at 19 if necessary to optimally match the residual $NO_x$ gases at 3. The gas mixture at 4 containing the optimal mixture of residual $NO_x$ and $NH_3$ based reagent enters the second stage $NO_x$ apparatus 102b for final polishing of the effluent gases to reduce residual $NO_x$ and $NH_3$ to ultra-low concentrations typically less than 1 ppm.

Figure 5:
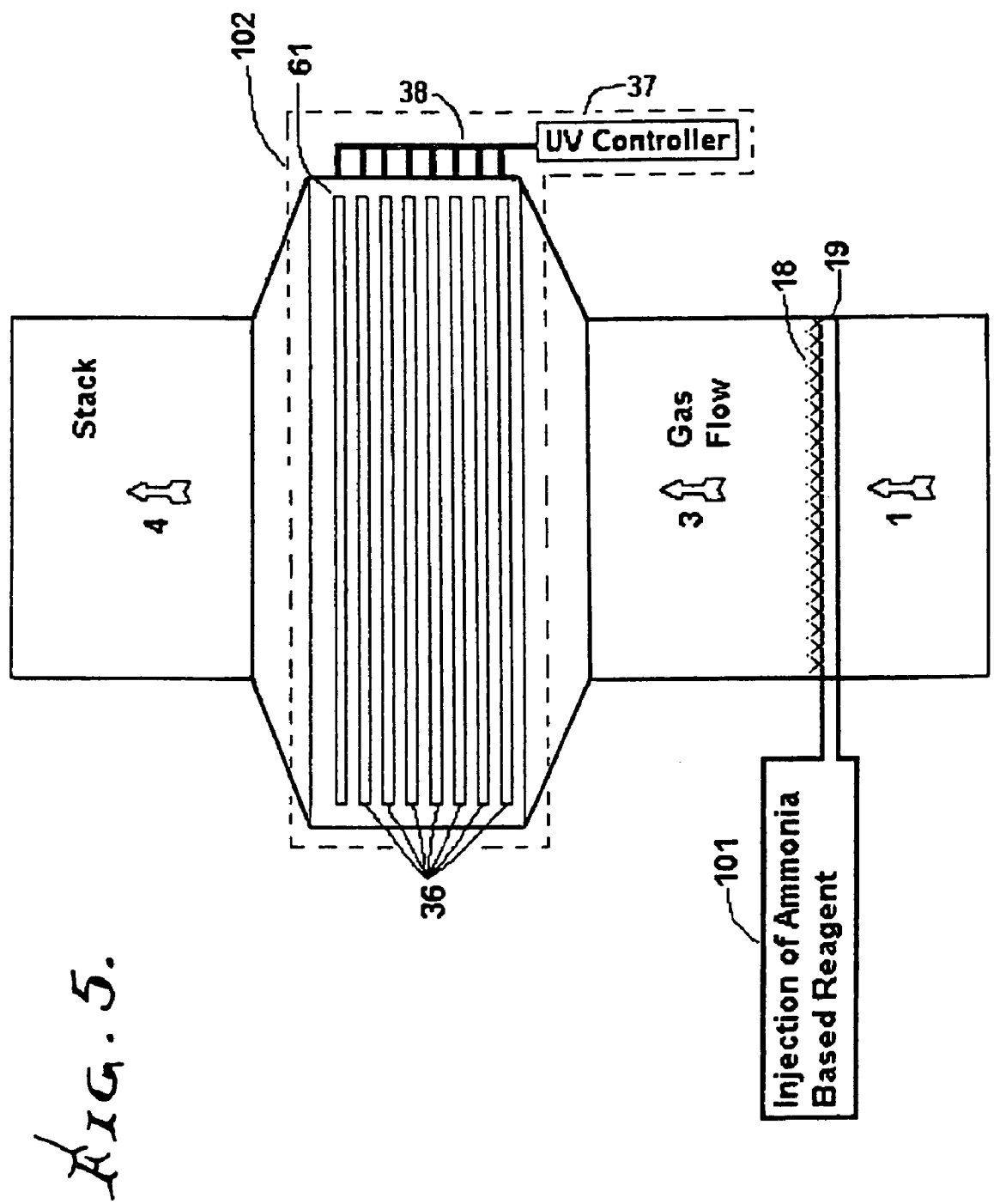
FIG. 5 is a view like FIG. 3b, but showing a succession of UV emitting tube clusters that can be replaced on the fly by the operators.

FIG. 5 depicts a SUVR apparatus as applied for $NO_x$ control on the flue or stack of a typical combustion device or process stream that is not equipped with an upstream NSCR, SCR, or SHR process. In such application no residual $NH_3$ is available in the effluent gases and apparatus 101 as generally described in FIG. 3 must be added to supply said reagent to the effluent gas stream. The effluent gases at 1 pass through the $NH_3$ based reagent injection system 101 where the reagent is added at 18 by injectors 19, to 3 where the gases contain sufficient $NH_3$ on a molar basis for complete reduction of $NO_x$ and through the UVR apparatus 102 where the $NO_x$ is reduced and to 4 where the purified gases are expelled. The diameter of duct 59 can be locally enlarged, outwardly of any of emitters 36, to slow the flow adjacent those emitters, to increase UV treatment time. Not shown is the gas analyzer 43 used in FIG. 3b to control the ammonia rate and UV output.

Figure 6:
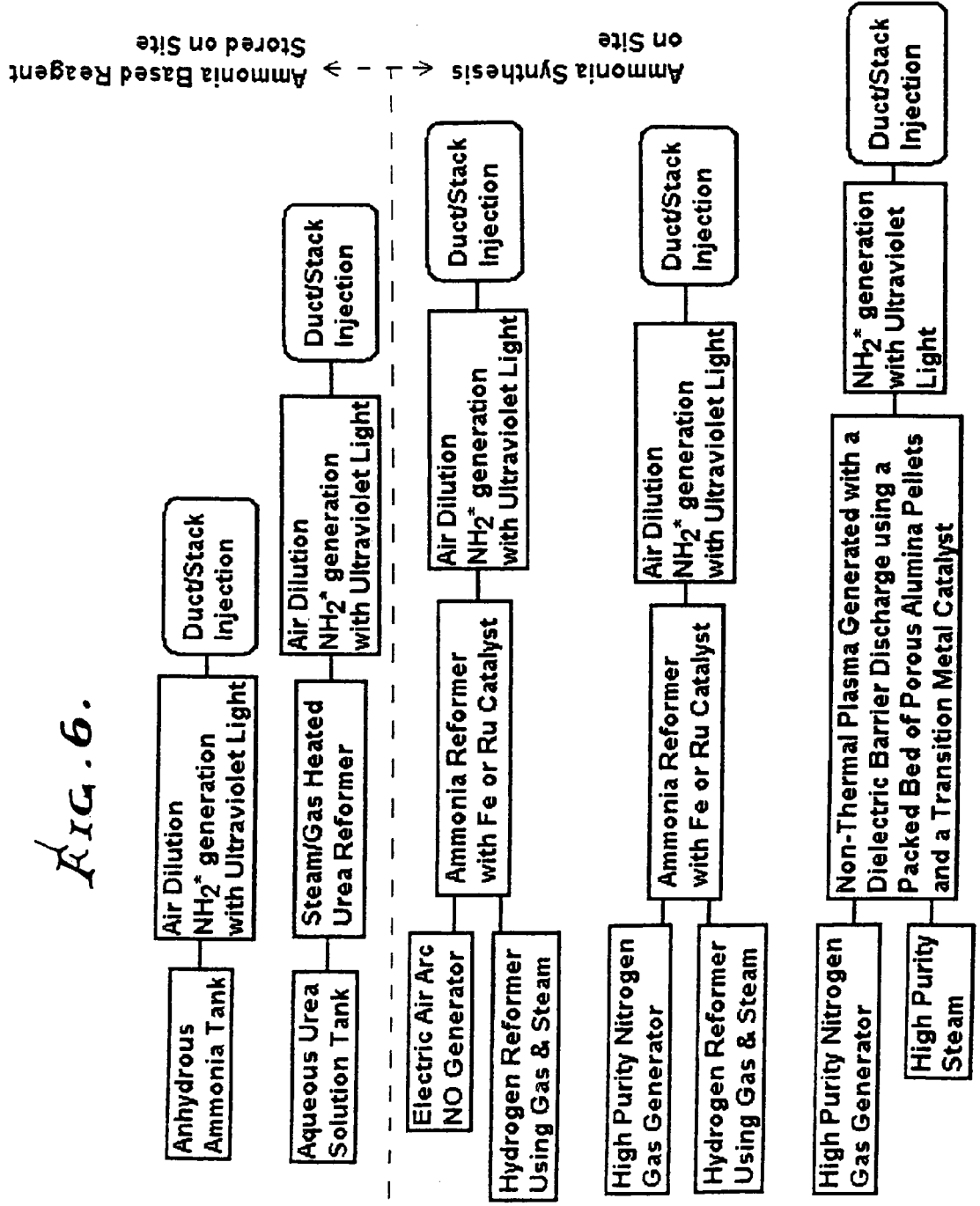
FIG. 6 shows various methods to create the amidogen radical for injection into exhaust gases. The top section uses stored ammonia based reagent to create amidogen while the bottom section uses ammonia synthesis from hydrogen gas reformed from the fuel source and nitrogen from air.

FIG. 6 shows various methods for generation of the excited state amidogen radical, $NH_2^*$. The first two methods use stored ammonia reagent to convert to the amidogen radical. The last three methods use a reforming step to generate ammonia on demand to feed the amidogen generator. This greatly reduces the storage of ammonia reagent down to a small back up tank for maintenance on the reformers. With the reformers, the ammonia is already in a dilute form to make the amidogen radical. The ultraviolet light generation step can be replaced with other methods as shown in FIG. 14.

FIG. 7 shows prior art of SCR as applied to the treatment of exhaust gases from a gas turbine. FIG. 7 also shows the means by which the pollution control equipment must be integrated into the heat recovery boiler to reach the optimal effluent gas temperatures for the oxidation catalyst and the SCR to function effectively. Access to the optimal gas temperatures increases the cost and size of the boiler and requires prolonged outages for repair or replacement of internal parts. Effluent gases containing $NO_x$ and combustion contaminants at 1 enters the heat recovery boiler and passes through a superheater or initial evaporator stage 110, at 2 to cool the gases to the optimal temperature for the reduction of combustion contaminants by an oxidation catalyst 104, and to an ammonia based reagent injection system 101, where the reagent for $NO_x$ control is added and then through another evaporator section 110, to additional cool the effluent gases to the optimal temperature at 5 for the SCR 111. The SCR reduces the $NO_x$ in the effluent gases and the purified gases leave the SCR at 6 and pass on through an economizer or other heat transfer surfaces 112, to the stack at 7.

FIG. 8 depicts the application of the SUVR process to a gas turbine with a similar heat recovery boiler. The contaminated effluent gases at 1' leave the gas turbine and pass through the evaporator section to 2' and through the ammonia based reagent injection system 101 to 3'. The mixture of untreated effluent gas and ammonia based reagent then flow through the remainder of the heat transfer surfaces to the stack or stack breaching 4' and purified by the SUVR process 102 and discharge at 5'. The UVR process can be configured to control only $NO_x$ gases such as described in FIG. 3a, or $NO_x$ and combustion contaminants such as in FIG. 3b. The heat recovery boiler in FIG. 8 compared to the heat recovery boiler in FIG. 7 is smaller, more conventional in design, and easier to maintain.

FIGS. 9, 9a and 9b show the use of an ArF@193 nm laser with a rasterization option as the radiation source as would be applied to large gas ducts. Other excimer or metal ion lasers can be used in the UV band ranging from 172 nm to 212 nm. For longer wavelength lasers, a frequency doubling or tripling crystal can be used to convert the wavelength into the VUV/UV-C bands. In this application of the SUVR process, the radiation source is excimer laser employing an argon-fluoride gas mixture to produce the controlled wavelength of 193 nm for the SUVR process as applied to a gas duct or stack of a combustion device or process stream. The rasterization of the laser beam is employed in the SUVR process to scan the flue gas as it flows through the duct. For high concentrations of NOx, a two stage laser process is used as demonstrated in FIG. 4a using UV elements. The SUVR process uses laser light when flues are large and UV bulbs or elements would be more difficult and costly to apply.

FIGS. 10 and 10a show the relative transmission path lengths of ultraviolet lines from a low pressure mercury vapor lamp. The important ultraviolet lines for photo-catalyzing the amidogen radical and $NO_x$ for the $NO_x$ reduction reaction are the 185 nm and 194 nm lines. The main 254 nm line from the low pressure lamp is shown for reference. The 185 nm is important for oxidizing combustion contaminants and/or VOC's and it has a treatment radius of approximately 1 inch around the element. The 194 nm line is important for nitrogen oxide reduction and it has a treatment radius of approximately 4 inches around the element. The 254 nm line is used to decompose ozone and activate titanium oxide coatings on the duct wall for VOC destruction. As shown in FIG. 10, the UV elements should be spaced so that the gas can be treated with the correct ultraviolet light frequency.

FIGS. 11a & 11b demonstrate a SUVR system installed in a wet or dry electrostatic precipitator. As shown in FIG. 11a, the ultraviolet tubular emitters are used as the dielectric electrode. The 254 nm ultraviolet light augments the electrostatic charge by creating surface charges on the particle while the 194 nm line photo-catalyzes the $NH_2^*$—$NO_x$ reaction. FIG. 11b shows the ultraviolet tubular emitters installed in a dry electrostatic precipitator. The ultraviolet emitters for the dry application have to run at a higher frequency and higher voltage to provide enough electrical current to attract particles to the chevrons or flow shields at turbulent gas velocities. Both the ammonia slip and nitrogen oxides are converted to nitrogen gas and water. The SUVR process eliminates the wet scrubbing of ammonia step in the electron beam process. See emitters 36a and 36b.

FIG. 12 demonstrates using chevrons to prevent erosion of the ultraviolet tubular elements and providing the ground plane for electro-static protection of the element. This method is used for element protection in FIG. 11b. The chevrons shade approximately ⅛ of the ultraviolet element output. For typical burner installations, usually only the first 3 rows need the chevron protection. See chevrons 60, and emitters 36.

FIGS. 13 and 13a demonstrate using annular injection of the clean gas around the ultraviolet tubular element to create a boundary layer of clean gas to prevent particle build up in very dirty exhaust gases. This method is used for element protection in FIG. 11a. In addition to the clean boundary layer of gas, the element is used to deliver an electro-static charge to attract particles to the wall. The compressed filtered gas can carry additional dry oxygen for photo-catalyzed reaction with VOC's or combustion contaminants, including CO or it can use dry nitrogen to produce atomic nitrogen to react with $NO_x$.

FIG. 14 shows four different methods of converting ammonia to the amidogen radical for injection into the exhaust gas stream. The first method is an ultraviolet lamp or LED's with output between 172 nm and 220 nm. The second method is a dielectric barrier discharge between two electrodes. The method shown is between a helical metal electrode and a cooled dielectric coated electrode, but two dielectric coated electrodes can be used to prevent corrosion to the metallic surface. The third method uses a dielectric pack bed electrode to reduce voltage drop and provide surface area for absorbed ammonia reactions. The forth method uses an electron beam with ammonia and water vapor to create the amidogen radical and hydrogen gas. Any of these methods can be used for the amidogen radical generator shown in FIG. 4b. See methods 14a-14d.

FIGS. 15 and 15a demonstrate the prior art of using a lance or wall nozzles to inject ammonia or urea into the exhaust gas. The major problem experience with this method is that it creates ammonia rich and ammonia lean zones in the exhaust gas as it enters the porous selective catalysis unit (SCR) as shown in FIG. 7. The boiler tubes do not significantly increase the mechanical mixing of the ammonia plumes; therefore, plant engineers have installed perforated plates to increase the mechanical mixing as well as the friction pressure drop in the flue. See lances 65.

FIGS. 16 and 16a demonstrate using a venturi late mixer to inject ammonia or gas containing the amidogen radical. The venturi plate can uniformly mix the gases together within 6 internal diameters of the venturi nozzle. This is very important for amidogen radical production because the radical needs to be uniformly mixed with the exhaust gas to react with the nitrogen oxides instead of recombining to make ammonia. This mixer is used to inject the amidogen radical in FIG. 4b. See mixers 68.

FIGS. 17, 17a, 17b and 17c show the installation of the SUVR process in a combustion device stack. The aqueous urea or ammonia solution is injected into exhaust stream with a venturi plate injector. The urea will decompose into ammonia gas. The evaporation of the liquid water drops will cool the exhaust below 600 K to optimize the $NO_x$ reduction reaction. The swirl inducers mix the ammonia plumes in the exhaust gas as well as provide a mechanical erosion barrier for the ultraviolet elements. See inducer blade 69.

FIGS. 18a, 18b and 18c show the miniaturization of the SUVR process for individual burners to reduce the formation of combustion contaminants, VOC and CO gases. FIG. 18a shows a typical combustion flame with natural gas. The flame starts at the burner tip with the fuel rich light blue core and surrounding the core is a transparent dark blue expansion cone. The flame is stable within flammability limits of the fuel gas such as 5-15% for methane gas. With preheating the air and methane gas, the lower flammability can be extended to below 4%. FIG. 18*b* shows the combustion flame of natural gas doped with free radicals. Note the light blue core is shorter and the transparent dark blue expansion cone is broader due faster flame speed. Doping the flue gas with few percent steam or 1-2% air and then passing the gas through one of the generators shown in FIG. 14, generates free radicals for ignition of gas at the burner tip. FIG. 18*c* shows combustion flame using a natural gas and air doped with free oxygen based radicals. Note the blue cone is still shorter than the typical natural gas flame. The free radicals are generated by pass in moist air through one of the generators shown in FIG. 14. Both fuel-based free radicals and oxygen-based free radicals have a short lifetime and the generator must be located very close to the burner in order for the SUVR process for fuel pretreatment to work. When the generator cannot be located near the burner, free radical combustion can be created by focusing an ultraviolet light laser beam or electron beam at the burner tip.

FIG. 19 shows the SUVR process installed for the spray painting, coating, dry or cleaning operation to remove VOC's from the exhaust air with the generation oxygen based free radicals. The fan draws the exhaust air through the particle filter to remove dust and other aerosols. The exhaust then passes through an ultraviolet source array that has electrostatic protection as demonstrated in FIG. 12. The ultraviolet source has a spectrum that has output between 172 nm to 227 nm with an optimum output between 179 nm to 187 nm for dry air and 185 nm to 195 nm for moist air. Other oxygen based free radical generators include electron beam, dielectric barrier discharge and corona discharge as shown in FIG. 14. For low levels of halogenated solvents, mercaptans or refrigerants, a particle filter impregnated with activated carbon or calcium oxide (not shown) can be used down stream to absorb the halogen or sulfuric acids created in the oxidation process. For high levels of halogenated solvents or sulfur based oils, an ammonia injection system with a dry electrostatic filter can be used to recover the acids as a precipitated salt. For spill clean ups and destruction of contaminated solvent, a wet electrostatic precipitator (not shown) can be used down stream to neutralize the acid vapors with an aqueous solution of base metal hydroxide such as sodium hydroxide (NaOH).

Figure 20:
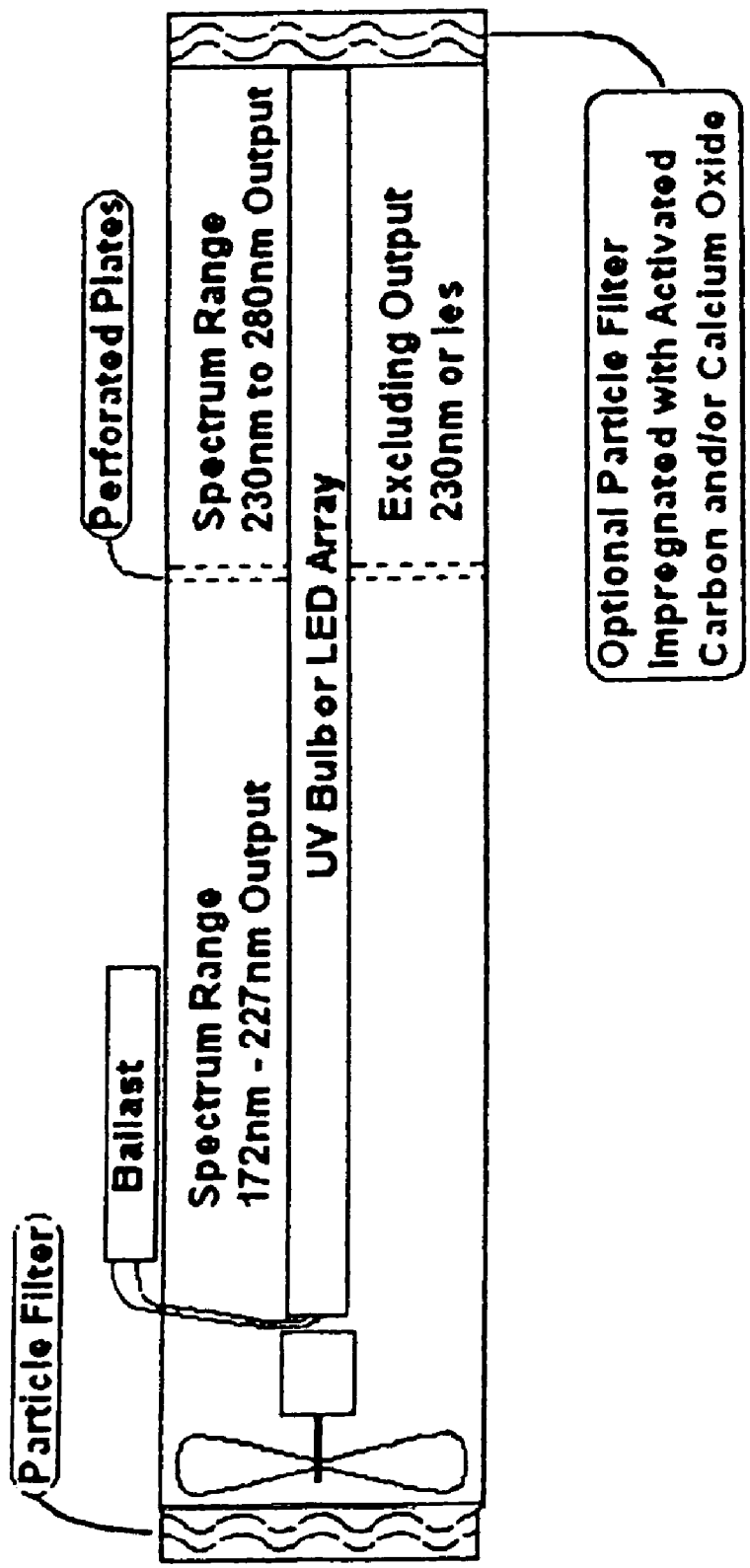

FIG. 20 shows a portable unit for removing VOC's in enclosed spaces such as after painting or spill clean up. The unit will safely remove VOC's up to the lower explosion limit of the air. A fan draws the contaminated air through the particle filter to remove dust and other aerosols. The air passes through the first ultraviolet stage with an output between 172 nm to 227 nm with an optimum output between 179 nm to 187 nm for dry air and 185 nm to 195 nm for moist air. The air then passes through to perforated plates into the ozone and chlorine gas destruction zone where ultraviolet light spectrum has no output below 230 nm, but has output between 230 nm to 280 nm with optimum output between 250 nm to 270 nm. An optional particle filter impregnated with activated carbon and/or calcium oxide can be used downstream to recover halogen or sulfuric acids.

In summary, the present invention provides apparatus and method that avoids the above limitations, and the subject of this invention addresses the need for a cost effective, readily adaptable and more efficient alternative to the use of conventional post combustion processes to reduce NOx emissions from effluent gas streams. The subject process herein referred to as the controlled spectrum ultraviolet radiation $NO_x$ reduction process, (UVR), is capable of achieving superior $NO_x$ reduction performance using the $NH_3$—$NO_x$ chemical reaction and with the virtual elimination of excess $NH_3$ emissions. In addition, the UVR process also oxidizes carbon monoxide (CO) gases to harmless CO2.

The present UVR process involves the use of a reagent such as ammonia, urea, or other chemical that yields ammonia gas in the effluent stream, the reagent being injected into the effluent gas stream by means such as by wall nozzles, injector grids or lances for carefully matching the $NO_x$ concentration in the effluent stream with the supplied or produced ammonia gas. This injection stage may utilize static mixing devices, multiple injection headers, or other techniques to affect uniform ammonia-$NO_x$ distribution.

The present UVR process differs from the SNCR, HRC, or the SCR processes in that means is applied to achieve reaction of the $NH_3$ with the $NO_x$ gases after the reagent has been effectively administered to or dispersed in the effluent stream. Promotion of the $NH_3$—$NO_x$ interaction involves the use of a controlled ultraviolet energy source that emits a high intensity energy flux in the form of ultraviolet rays with carefully prescribed wavelengths between 180 nm and 280 nm and having sufficient intensity to dissociate virtually all $NH_3$ passing through the ultraviolet beam. The dissociated $NH_3$ or $NH_2^*$ reacts with $NO_x$ to form $N_2$ and $H_2O$, the present process more efficiently dissociating the $NH_3$ gas for promotion of the $NH_3$—$NO_x$ chemical reaction than the methods employed by the SNCR, SHR, and the SCR processes.

The present UVR process does not require a catalyst bed as is associated with the SCR process, and thereby avoids the aforementioned limitations and disadvantages.

The present UVR process can be applied at any practical temperature consistent with the long term reliability of the UV source and method of application. By avoiding need for high thermal temperatures as are associated with the SNCR process, the UVR process overcomes the efficiency limitations caused by the high temperature reaction chemistry. The process is more efficient for temperatures less than 400° F. Typically, a system and method is provided for photo-catalyzing the oxidation of ammonia to nitrogen gas. UV light between 180 nm and 280 nm is used to convert NH3 (ammonia) to NH2* radical which reacts with $NO_x$ to make $N_2$ (nitrogen gas) and $H_2O$ (water vapor) at low temperature range (100-35 F). UV light between 190 nm and 200 nm is also used to convert $H_2O$ OH* radical which reacts with CO to make Co2 and H2.

Although the present UVR process precludes the need for injecting the reagent into high temperature gases, such as used by SNCR or SHR processes, or the need to use a catalyst bed such as in the SHR and the SCR processes, the process can be applied to effluent streams that are already using these processes to enhance their efficiency on such SNCR, HCR, and SCR applications that are experiencing or might soon experience $NH_3$—$NO_x$ chemistry limitations as described above, to achieve greater $NO_x$ control and/or to eliminate $NH_3/NO_x$ emission problems.

In applying the UVR process to existing process systems employing either of the SNCR, SHR, or the SCR processes, the present UVR process is typically installed downstream of such processes and no modifications to the reagent injection system would be mandatory. This invention also contemplates application of the UVR process to effluent gas streams that already employ post combustion control processes, for controlling $NO_x$ emissions.

The invention provides a best mode method for reducing or substantially eliminating oxides of nitrogen from a hot effluent gas stream that includes the steps:

a) providing a source of ultraviolet radiation associated with a duct passing said effluent stream, b) adding ammonia to the stream, upstream of the ultraviolet radiation source, c) controllably operating said ultraviolet radiation source to irradiate said stream flowing in the duct, to effect reduction or substantial elimination of said oxides of nitrogen by promoting, reaction of ammonia with said oxides of nitrogen, to produce NO and $H_2O$ flowing in the stream.

The method typically includes controlling the rate of ammonia added to said stream to promote said reduction or substantial elimination of oxides of nitrogen from the stream the oxide content subject to variance. Operation of the radiation source is effected to control the wavelength of said radiation to dissociate substantially all of the ammonia added into said stream.

We claim:

1. The SUVR method for reducing or substantially eliminating oxides of nitrogen ($NO_x$) from an effluent gas stream between 300-800° K and that contains oxygen gas ($O_2$) by reacting $NO_x$ with the amidogen radical ($NH_2^*$) to form to harmless nitrogen gas ($N_2$) and water vapor ($H_2O$), the method including the steps:

a) providing a source of ultraviolet radiation with output between 180 nm and 220 nm associated with a duct containing the effluent stream, or streams, b) mixing ammonia or an ammonia-based reagent with said stream, upstream of said ultraviolet radiation source so that the variance is within +15/−5% of stoichiometric concentration, c) causing said ultraviolet radiation source to irradiate the stream with effective wavelength band and intensity flux sufficient to dissociate the ammonia molecules ($NH_3$) to the amidogen radicals ($NH_2^*$) and to excite and dissociate $NO_x$ molecules to promote the ($NO+NH_2^*$) to ($N_2+H_2O$) reduction reaction, d) and controlling the rate of ammonia or ammonia based reagent added to said stream including measuring upstream $NO_x$ and downstream $NO_x$ and/or $NH_3$ slip.

2. The method of claim 1 including providing an excimer or ion laser with rasterization of effluent gas with beam or beams in the UV spectrum between 172 nm and 220 nm, and optionally using an ArF laser at 193 nm output as an optimal excimer laser for the SUVR process, with optional laser output in visible or near infrared spectrum, frequency doublers or quadruples being used to reduce the wavelength to the useful UV spectrum.

3. The method of claim 1 including employing electrostatic force to reduce or prevent particle buildup on tubular or planer emitter surfaces and to encourage particle collection on an impact shield, the electrostatic force being created by a high frequency, voltage source connected to the emitter surface while an impact shield is used as the ground plane.

4. The method of claim 1 wherein an amidogen generator is provided using as an ultraviolet source, a laser with spectrum out put between 172 nm and 220 nm, or a corona discharge using a metal electrode and a dielectric surface or two dielectric surfaces, or a packed dielectric bed discharge, or an electron beam.

5. The method of claim 1 including providing low pressure mercury vapor lamps operating as said source of ultraviolet radiation.

6. The method of claim 1 wherein the source is provided in the form of elongated, spaced apart irradiation means extending in the duct, and transversely thereof whereby the effluent stream passes over said spaced apart means.

7. The method of claim 6 wherein the irradiation means include multiple tubes located generally centrally in the duct.

8. The SUVR method for reducing or substantially eliminating oxides of nitrogen ($NO_x$) from an effluent gas stream between 300-800° K and that contains oxygen gas ($O_2$) by reacting $NO_x$ with the amidogen radical ($NH_2^*$) to form to harmless nitrogen gas ($N_2$) and water vapor ($H_2O$), the method including the steps:

a) providing a source of ultraviolet radiation with output between 180 nm and 220 nm associated with a duct containing the effluent stream, or streams, b) mixing ammonia or an ammonia-based reagent with said stream, upstream of said ultraviolet radiation source so that the variance is within +15%/−5% of stoichiometric concentration, c) causing said ultraviolet radiation source to irradiate the stream with effective wavelength band and intensity flux sufficient to dissociate the ammonia molecules ($NH_3$) to the amidogen radicals ($NH_2^*$) and to excite and dissociate $NO_x$ molecules to promote the ($NO+NH_2^*$) to ($N_2+H_2O$) reduction reaction, d) and including effecting dissociation of virtually all of the ammonia and producing a purified effluent stream that contains an insignificant amount of residual ammonia.

9. The method of claim 8 including controlling the rate of ammonia or ammonia based reagent added to said stream including measuring upstream $NO_x$ and downstream $NO_x$ and/or $NH_3$ slip.

10. The SUVR method for reducing or substantially eliminating oxides of nitrogen ($NO_x$) from an effluent gas stream between 300-800° K and that contains oxygen gas ($O_2$) by reacting $NO_x$ with the amidogen radical ($NH_2^*$) to form to harmless nitrogen gas ($N_2$) and water vapor ($H_2O$), the method including the steps:

a) providing a source of ultraviolet radiation with output between 180 nm and 220 nm associated with a duct containing the effluent stream, or streams, b) mixing ammonia or an ammonia-based reagent with said stream, upstream of said ultraviolet radiation source so that the variance is within +15%/−5% of stoichiometric concentration, c) causing said ultraviolet radiation source to irradiate the stream with effective wavelength band and intensity flux sufficient to dissociate the ammonia molecules ($NH_3$) to the amidogen radicals ($NH_2^*$) and to excite and dissociate $NO_x$ molecules to promote the ($NO+NH_2^*$) to ($N_2+H_2O$) reduction reaction, d) and including controlling the volumetric flux of UV radiation in response to measuring/sampling upstream $NO_x$ and downstream $NO_x$ and $NH_3$ slip and in response to measuring actual UV flux in the reaction zone.

11. The SUVR method for reducing or substantially eliminating oxides of nitrogen ($NO_x$) from an effluent gas stream between 300-800° K and that contains oxygen gas ($O_2$) by reacting $NO_x$ with the amidogen radical ($NH_2^*$) to form to harmless nitrogen gas ($N_2$) and water vapor ($H_2O$), the method including the steps:

a) providing a source of ultraviolet radiation with output between 180 nm and 220 nm associated with a duct containing the effluent stream, or streams, b) mixing ammonia or an ammonia-based reagent with said stream, upstream of said ultraviolet radiation source so that the variance is within +15%/−5% of stoichiometric concentration, c) causing said ultraviolet radiation source to irradiate the stream with effective wavelength band and intensity flux sufficient to dissociate the ammonia molecules ($NH_3$) to the amidogen radicals ($NH_2^*$) and to excite and dissociate $NO_x$ molecules to promote the ($NO+NH_2^*$) to ($N_2$+ $H_2O$) reduction reaction, d) and including employing a two stage retrofit or technology transition system for reducing $NO_x$ levels, where the first stage is a conventional NSCR, SCR or SHR system and the second stage is a SUVR system with ultraviolet elements acting to polish the ammonia and $NO_x$ slip to below 1 ppm.

12. The SUVR method for reducing or substantially eliminating oxides of nitrogen ($NO_x$) from an effluent gas stream between 300-800° K and that contains oxygen gas ($O_2$) by reacting $NO_x$ with the amidogen radical ($NH_2^*$) to form to harmless nitrogen gas ($N_2$) and water vapor ($H_2O$), the method including the steps:

a) providing a source of ultraviolet radiation with output between 180 nm and 220 nm associated with a duct containing the effluent stream, or streams,
   b) mixing ammonia or an ammonia-based reagent with said stream, upstream of said ultraviolet radiation source so that the variance is within +15%/−5% of stoichiometric concentration,
   c) causing said ultraviolet radiation source to irradiate the stream with effective wavelength band and intensity flux sufficient to dissociate the ammonia molecules ($NH_3$) to the amidogen radicals ($NH_2^*$) and to excite and dissociate $NO_x$ molecules to promote the ($NO+NH_2^*$) to ($N_2$+ $H_2O$) reduction reaction,
   d) and wherein the radiation source is provided in the form of elongated tubular emitters spaced apart and located in an orientation with respect to the velocity vector of the effluent stream, whereby the pollutant gases flowing around the emitters are treated uniformly and completely.

13. The SUVR method for reducing or substantially eliminating oxides of nitrogen ($NO_x$) from an effluent gas stream between 300-800° K and that contains oxygen gas ($O_2$) by reacting $NO_x$ with the amidogen radical ($NH_2^*$) to form to harmless nitrogen gas ($N_2$) and water vapor ($H_2O$), the method including the steps:

a) providing a source of ultraviolet radiation with output between 180 nm and 220 nm associated with a duct containing the effluent stream, or streams,
   b) mixing ammonia or an ammonia-based reagent with said stream, upstream of said ultraviolet radiation source so that the variance is within +15%/−5% of stoichiometric concentration,
   c) causing said ultraviolet radiation source to irradiate the stream with effective wavelength band and intensity flux sufficient to dissociate the ammonia molecules ($NH_3$) to the amidogen radicals ($NH_2^*$) and to excite and dissociate $NO_x$ molecules to promote the ($NO+NH_2^*$) to ($N_2$+ $H_2O$) reduction reaction,
   d) and wherein a radiation source is provided in the form of one or more LED arrays producing the effective wavelength and intensity of radiation.

14. The SUVR method for reducing or substantially eliminating oxides of nitrogen ($NO_x$) from an effluent gas stream between 300-800° K and that contains oxygen gas ($O_2$) by reacting $NO_x$ with the amidogen radical ($NH_2^*$) to form to harmless nitrogen gas ($N_2$) and water vapor ($H_2O$), the method including the steps:

a) providing a source of ultraviolet radiation with output between 180 nm and 220 nm associated with a duct containing the effluent stream, or streams,
   b) mixing ammonia or an ammonia-based reagent with said stream, upstream of said ultraviolet radiation source so that the variance is within +15%/−5% of stoichiometric concentration,
   c) causing said ultraviolet radiation source to irradiate the stream with effective wavelength band and intensity flux sufficient to dissociate the ammonia molecules ($NH_3$) to the amidogen radicals ($NH_2^*$) and to excite and dissociate $NO_x$ molecules to promote the ($NO+NH_2^*$) to ($N_2$+ $H_2O$) reduction reaction,
   d) and wherein the tubular emitters are located around the perimeter of a duct passing said flow stream.

15. The method of controlling the wavelength and the volumetric flux intensity of an SUVR process to reduce or substantially eliminate unburned hydrocarbons or volatile organic compounds, VOC's, ($C_xH_yO_z$) including carbon monoxide (CO) and halogenated VOC's ($C_xH_y(F,Cl,Br,I)_z$) from effluent gas streams that contain oxygen gas ($O_2$) and water vapor ($H_2O$) by reacting these species with oxygen based radicals ($O^*$, $O_2^-$, $HO_2^*$, $OH^*$) to form to carbon dioxide ($CO_2$) and water vapor ($H_2O$), the method including:

a) providing a source of ultraviolet radiation with output between 172 nm and 220 nm associated with a duct containing the effluent stream, or streams,
   b) providing a source of electrons with energies of 4 eV or greater, derived from a corona discharge or electron beam,
   c) causing said ultraviolet radiation, or electron source, to achieve intensity flux sufficient to dissociate the water molecule ($H_2O$) and the oxygen molecule ($O_2$) to oxygen based radicals ($O^*$, $O_2^-$, $HO_2^*$, $OH^*$) and to excite VOC molecules ($C_xH_yO_z$) to expedite the oxidation reaction and dissociate halogenated VOC's (F,Cl,Br,I) to form halogen acids,
   d) and including removing halogen acids (HF, HCl, HBr, or HI) and sulfuric acid ($H_2SO_4$) generated in the oxidation process down stream by converting them to an ammonium salt or salts, the method using wet or dry electrostatic precipitation, or by absorbing the halogen acid in an aqueous solution containing a base metal (Na, Ca, Mg, K, etc.) or by absorption on a filter impregnated with activated carbon and/or calcium or magnesium oxide.

16. The method of claim 15 including operating a two stage system for reducing high levels of VOC's by factor greater than 100, wherein the first stage includes injection of ozone, or ozonated air, or oxygen based radicals ($O^*$, $O_2^-$, $HO_2^*$, $OH^*$) from a generator using water vapor and an oxygen source, and the second stage uses ultraviolet radiation or electron source to achieve intensity flux to dissociate the water molecules ($H_2O$) and the residual oxygen molecules ($O_2$) to oxygen based radicals ($O^*$, $O_2^-$, $HO_2^*$, $OH^*$) and to excite remaining VOC molecules ($C_xH_yO_z$) to expedite the oxidation reaction and dissociate halogenated VOC's (F,Cl, Br,I) to form halogen acids.

17. The method of claim 16 including controlling the volumetric concentration of injected oxygen based radicals by measuring/sampling upstream VOC's and downstream oxidation products with mid-infrared spectroscopy or full range UV-B to near infrared spectroscopy and by measuring second stage UV flux in the reaction zone and oxygen and/or water vapor content.

18. The method of claim 15 including controlling the volumetric flux of UV radiation or electron bombardment by measuring/sampling upstream VOC's and downstream oxidation products with mid-infrared spectroscopy or full range UV-B to near infrared spectroscopy and by measuring actual UV flux in the reaction zone and oxygen and/or water vapor content.

19. The method of claim 15 wherein the CO or VOC's are controlled in an initial process stage followed by a $NO_x$ reduction stage that includes the injection of ammonia-based reagent, mixing of the reagent in the effluent gas stream and photo-chemical reduction of $NO_x$.

20. The method of claim 19 of a two stage SUVR process whereby the $NO_x$ is controlled and residual ammonia effectively destroyed in an initial process stage followed by a VOC destruction stage to effectively purify the effluent gas stream.

21. The SUVR method for reducing or substantially eliminating oxides of nitrogen ($NO_x$) from an effluent gas stream between 300-800° K and that contains oxygen gas ($O_2$) by reacting $NO_x$ with the amidogen radical ($NH_2^*$) to form to harmless nitrogen gas ($N_2$) and water vapor ($H_2O$), the method including the steps:
   a) providing a source of ultraviolet radiation with output between 180 nm and 220 nm associated with a duct containing the effluent stream, or streams,
   b) mixing ammonia or an ammonia-based reagent with said stream, upstream of said ultraviolet radiation source so that the variance is within +15%/−5% of stoichiometric concentration,
   c) causing said ultraviolet radiation source to irradiate the stream with effective wavelength band and intensity flux sufficient to dissociate the ammonia molecules ($NH_3$) to the amidogen radicals ($NH_2^*$) and to excite and dissociate $NO_x$ molecules to promote the ($NO+NH_2^*$) to ($N_2+H_2O$) reduction reaction,
   d) and including embodying the UV source in a mobile device that is self contained and includes a circulation fan and particulate matter filter, for use in areas where people are present and where the VOC's may present a potential health or safety hazard, and wherein the ultraviolet source optionally has two zones; the first zone for making oxygen based free radicals and ozone, and the second stage for ozone and chlorine gas destruction.

22. The method of claim 21 including employing a downstream particle filter impregnated with activated carbon and/or calcium oxide to absorb halogen or sulfuric acids.

23. The SUVR method for reducing or substantially eliminating oxides of nitrogen ($NO_x$) from an effluent gas stream between 300-800° K and that contains oxygen gas ($O_2$) by reacting $NO_x$ with the amidogen radical ($NH_2^*$) to form to harmless nitrogen gas ($N_2$) and water vapor ($H_2O$), the method including the steps:
   a) providing a source of ultraviolet radiation with output between 180 nm and 220 nm associated with a duct containing the effluent stream, or streams,
   b) mixing ammonia or an ammonia-based reagent with said stream, upstream of said ultraviolet radiation source so that the variance is within +15%/−5% of stoichiometric concentration,
   c) causing said ultraviolet radiation source to irradiate the stream with effective wavelength band and intensity flux sufficient to dissociate the ammonia molecules ($NH_3$) to the amidogen radicals ($NH_2^*$) and to excite and dissociate $NO_x$ molecules to promote the ($NO+NH_2^*$) to ($N_2+H_2O$) reduction reaction,
   d) including providing an electrostatic precipitator and operating said source of ultraviolet radiation in series with said precipitator.

24. The SUVR method for reducing or substantially eliminating oxides of nitrogen ($NO_x$) from an effluent gas stream between 300-800° K and that contains oxygen gas ($O_2$) by reacting $NO_x$ with the amidogen radical ($NH_2^*$) to form to harmless nitrogen gas ($N_2$) and water vapor ($H_2O$), the method including the steps:
   a) providing a source of ultraviolet radiation with output between 180 nm and 220 nm associated with a duct containing the effluent stream, or streams,
   b) mixing ammonia or an ammonia-based reagent with said stream, upstream of said ultraviolet radiation source so that the variance is within +15%/−5% of stoichiometric concentration,
   c) causing said ultraviolet radiation source to irradiate the stream with effective wavelength band and intensity flux sufficient to dissociate the ammonia molecules ($NH_3$) to the amidogen radicals ($NH_2^*$) and to excite and dissociate $NO_x$ molecules to promote the ($NO+NH_2^*$) to ($N_2+H_2O$) reduction reaction,
   d) and wherein said source of ultraviolet radiation comprises multiple UV bulbs, which are spaced apart in the path of said effluent stream, and providing chevron shaped elements in said path directly upstream of said bulbs to protect the bulbs from erosion from effluent particles impact.

25. The SUVR method for reducing or substantially eliminating oxides of nitrogen ($NO_x$) from an effluent gas stream between 300-800° K and that contains oxygen gas ($O_2$) by reacting $NO_x$ with the amidogen radical ($NH_2^*$) to form to harmless nitrogen gas ($N_2$) and water vapor ($H_2O$), the method including the steps:
   a) providing a source of ultraviolet radiation with output between 180 nm and 220 nm associated with a duct containing the effluent stream, or streams,
   b) mixing ammonia or an ammonia-based reagent with said stream, upstream of said ultraviolet radiation source so that the variance is within +15%/−5% of stoichiometric concentration,
   c) causing said ultraviolet radiation source to irradiate the stream with effective wavelength band and intensity flux sufficient to dissociate the ammonia molecules ($NH_3$) to the amidogen radicals ($NH_2^*$) and to excite and dissociate $NO_x$ molecules to promote the ($NO+NH_2^*$) to ($N_2+H_2O$) reduction reaction,
   d) and wherein said source of ultraviolet radiation comprises one or more UV bulbs, and including the step of flowing particle free gas adjacent the bulb or bulbs as a protection from erosion due to effluent particle impact.

26. The SUVR method for reducing or substantially eliminating oxides of nitrogen ($NO_x$) from an effluent gas stream between 300-800° K and that contains oxygen gas ($O_2$) by reacting $NO_x$ with the amidogen radical ($NH_2^*$) to form to harmless nitrogen gas ($N_2$) and water vapor ($H_2O$), the method including the steps:
   a) providing a source of ultraviolet radiation with output between 180 nm and 220 am associated with a duct containing the effluent stream, or streams,
   b) mixing ammonia or an ammonia-based reagent with said stream, upstream of said ultraviolet radiation source so that the variance is within +15%/−5% of stoichiometric concentration,
   c) causing said ultraviolet radiation source to irradiate the stream with effective wavelength band and intensity flux sufficient to dissociate the ammonia molecules ($NH_3$) to the amidogen radicals ($NH_2^*$) and to excite and dissociate $NO_x$ molecules to promote the ($NO+NH_2^*$) to ($N_2+H_2O$) reduction reaction, d) including converting ammonia to amidogen radical or radically for injection into the effluent stream.

27. The method of claim 26 wherein said converting step is one of the following:
   i) operation of an ultraviolet lamp,
   ii) operation of LEDs,
   iii) dielectric barrier discharge between electrodes,
   iv) provision and operation of a dielectric pack bed electrode to provide surface area for absorbed ammonia reactions,
   v) provision and operation of an electron beam generator to subject ammonia and water to electron beam processing to create amidogen radical and hydrogen gas.

28. The SUVR method for reducing or substantially eliminating oxides of nitrogen ($NO_x$) from an effluent gas stream between 300-800° K and that contains oxygen gas ($O_2$) by reacting $NO_x$ with the amidogen radical ($NH_2^*$) to form to harmless nitrogen gas ($N_2$) and water vapor ($H_2O$), the method including the steps:
   a) providing a source of ultraviolet radiation with output between 180 nm and 220 nm associated with a duct containing the effluent stream, or streams,
   b) mixing ammonia or an ammonia-based reagent with said stream, upstream of said ultraviolet radiation source so that the variance is within +15%/−5% of stoichiometric concentration,
   c) causing said ultraviolet radiation source to irradiate the stream with effective wavelength band and intensity flux sufficient to dissociate the ammonia molecules ($NH_3$) to the amidogen radicals ($NH_2^*$) and to excite and dissociate $NO_x$ molecules to promote the ($NO+NH_2^*$) to ($N_2+H_2O$) reduction reaction,
   d) including providing a combustion process stack, wherein said effluent stream flows, during stream irradiation.

29. The SUVR method for reducing or substantially eliminating oxides of nitrogen ($NO_x$) from an effluent gas stream between 300-800° K and that contains oxygen gas ($O_2$) by reacting $NO_x$ with the amidogen radical ($NH_2^*$) to form to harmless nitrogen gas ($N_2$) and water vapor ($H_2O$), the method including the steps:
   a) providing a source of ultraviolet radiation with output between 180 nm and 220 nm associated with a duct containing the effluent stream, or streams,
   b) mixing ammonia or an ammonia-based reagent with said stream, upstream of said ultraviolet radiation source so that the variance is within +15%/−5% of stoichiometric concentration,
   c) causing said ultraviolet radiation source to irradiate the stream with effective wavelength band and intensity flux sufficient to dissociate the ammonia molecules ($NH_3$) to the amidogen radicals ($NH_2^*$) and to excite and dissociate $NO_x$ molecules to promote the ($NO+NH_2^*$) to ($N_2+H_2O$) reduction reaction,
   d) including removing one of the following from the effluent stream prior to said irradiation:
   $x_1$) particulate
   $x_2$) aerosols
   $x_3$) VOCs.

30. Apparatus for reducing or substantially eliminating oxides of nitrogen from a hot effluent gas stream, that comprises:
   a) a duct and a source of ultraviolet radiation associated with said duct passing said effluent stream,
   b) means for adding ammonia or amidogen radicals to said stream, upstream of said ultraviolet radiation source, and
   c) means for controllably operating said ultraviolet radiation source to irradiate said stream flowing in the duct, to effect reduction or substantial elimination of said oxides of nitrogen by promoting, reaction of ammonia with said oxides of nitrogen, to produce $N_2$ and $H_2O$ flowing in the stream,
   d) and wherein said source of ultraviolet radiation comprises UV emitting means extending in generally clustered relation.

31. The apparatus of claim 30 wherein said source of ultraviolet radiation comprises UV emitting tubes extending in generally clustered relation.

32. The apparatus of claim 31 wherein said tubes extend in parallel relation to an X-direction; the tubes being spaced apart in a Y-direction; and the duct extending in a Z-direction, where said directions are the X, Y and Z directions in a rectangular co-ordinate system.

33. The apparatus of claim 31 wherein said tubes are arrayed in staggered relation presented toward the oncoming stream.

34. The apparatus of claim 31 wherein the duct is locally enlarged to receive said tubes, for enhanced radiation transmission to the stream.

35. The apparatus of claim 30 wherein said a), b) and c) comprise a first stage apparatus, and also including a second stage apparatus having a'), b') and c'), corresponding to said a), b) and c).

36. The apparatus of claim 30 wherein said source of amidogen radicals includes steam reforming means.

37. The apparatus of claim 30 wherein UV generator means is located in the duct to provide about 254 nanometers and about 185 nanometers transverse radiation path lengths relative to the duct wall.

38. The apparatus of claim 37 wherein the duct wall provides a reflective inner surface for said about 254 nanometer radiation.

39. The apparatus of claim 30 wherein said radiation source is one of the following types:
   i) UV generator,
   ii) LED generator,
   iii) dielectric barrier between two electrodes,
   iv) dielectric pack electrode means,
   v) electron beam.

40. A method for reducing or substantially eliminating oxides of nitrogen from a hot effluent gas stream, that includes
   a) providing a clustered source of ultraviolet radiation less than about 220 nanometers and associated with a duct passing said effluent stream,
   b) adding ammonia to said stream, upstream of said ultraviolet radiation source,
   c) controlling the rate of ammonia addition to said stream and controllably operating said ultraviolet radiation source to irradiate said stream flowing in the duct, to effect reduction or substantial elimination of said oxides of nitrogen by promoting reaction of ammonia with said oxides of nitrogen, to produce $N_2$ and $H_2O$ flowing in the stream.

* * * * *